(12) United States Patent
Taira et al.

(10) Patent No.: US 11,052,759 B2
(45) Date of Patent: Jul. 6, 2021

(54) TRAVELING VEHICLE

(71) Applicant: Kubota Corporation, Osaka (JP)

(72) Inventors: Kensuke Taira, Osaka (JP); Toyohiko Kumatori, Osaka (JP); Satoshi Yoshikawa, Osaka (JP); Takuya Inamori, Osaka (JP)

(73) Assignee: Kubota Corporation, Osaka (JP)

( * ) Notice: Subject to any disclaimer, the term of this patent is extended or adjusted under 35 U.S.C. 154(b) by 149 days.

(21) Appl. No.: 16/472,617

(22) PCT Filed: Sep. 18, 2018

(86) PCT No.: PCT/JP2018/034400
§ 371 (c)(1),
(2) Date: Jun. 21, 2019

(87) PCT Pub. No.: WO2019/065356
PCT Pub. Date: Apr. 4, 2019

(65) Prior Publication Data
US 2020/0001710 A1 Jan. 2, 2020

(30) Foreign Application Priority Data

Sep. 27, 2017 (JP) .............................. JP2017-186504

(51) Int. Cl.
*B60K 20/06* (2006.01)
*F16H 59/10* (2006.01)
(Continued)

(52) U.S. Cl.
CPC ............. *B60K 20/06* (2013.01); *F16H 59/10* (2013.01); *G05G 1/06* (2013.01); *B62D 1/185* (2013.01)

(58) Field of Classification Search
CPC ......... B60K 20/06; B60K 20/08; F16H 59/10; G05G 1/06; B62D 1/185; B62D 1/14
See application file for complete search history.

(56) References Cited

U.S. PATENT DOCUMENTS 2,272,897 A * 2/1942 Riesing .................... G05G 1/06
74/523

FOREIGN PATENT DOCUMENTS

| JP | H01126337 U | * | 8/1989 |
| JP | 2011-131646 A | | 7/2011 |

(Continued)

OTHER PUBLICATIONS

International Search Report issued in corresponding International Application No. PCT/JP2018/034400 dated Oct. 23, 2018, with translation (3 pages).

(Continued)

*Primary Examiner* — Thomas C Diaz
(74) *Attorney, Agent, or Firm* — Osha Bergman Watanabe & Burton LLP

(57) ABSTRACT

A traveling vehicle includes: a body; a steering wheel that is attached to the body and rotates around a rotating shaft; and a forward-reverse switching lever that switches between a forward position, a neutral position, and a reverse position. The forward-reverse switching lever includes: a lever main body that is pulled up at the neutral position and swings forward or rearward in a pulled-up state; and a grip mounted to an upper portion of the lever main body, the grip includes: a base portion including an upper face; and a protruding portion protruding downward from the base portion, and the protruding portion includes: a distal face that is opposite a rotating-shaft side of the protruding portion; a first side face; and a second side face.

14 Claims, 17 Drawing Sheets

(51) Int. Cl.
*G05G 1/06* (2006.01)
*B62D 1/185* (2006.01)

(56) References Cited

FOREIGN PATENT DOCUMENTS

| | | |
|---|---|---|
| JP | 2014-213614 A | 11/2014 |
| JP | 6181409 B2 | 8/2017 |
| WO | WO-2009060740 A1 * 5/2009 | ......... F16H 59/0204 |

OTHER PUBLICATIONS

Written Opinion of the International Searching Authority issued in corresponding International Application No. PCT/JP2018/034400 dated Oct. 23, 2018 (3 pages).
Extended European Search Report issued in corresponding European Patent Application 18861282.4 dated Mar. 12, 2021 (5 pages).
Office Action issued in corresponding Indian Patent Application No. 201947050987 dated Apr. 1, 2021 (7 pages).

\* cited by examiner

TRAVELING VEHICLE

TECHNICAL FIELD

The present invention relates to a traveling vehicle provided with forward-reverse switching lever.

BACKGROUND

Conventionally known is the traveling vehicle disclosed in patent literature 1.

The traveling vehicle disclosed in patent literature 1 is provided with a steering wheel and a forward-reverse switching lever that can switch to forward, neutral, and reverse positions. The forward-reverse switching lever has a grip disposed near the steering wheel and a connecting member connected to the grip. A convex portion is provided on an edge of a bottom face of the grip.

PATENT LITERATURE

Patent literature 1: Japanese Patent No. 6181409

In the above traveling vehicle, by hooking the finger on the convex portion provided on the edge of the bottom face of the grip while grasping the steering wheel and swinging the forward-reverse switching lever forward or rearward upon pulling up on the forward-reverse switching lever, an operation is possible of switching the forward-reverse switching lever to the forward, neutral, and reverse positions. However, because a force of holding the grip is not sufficiently obtained in a state where the finger is hooked on the convex portion provided on the edge of the bottom face of the grip, there is a situation where the operation cannot be reliably performed. Moreover, because a two-step operation of an operation of pulling up on the forward-reverse switching lever and an operation of swinging the forward-reverse switching lever forward or rearward is necessary, operability is unfavorable.

SUMMARY

One or more embodiments of the present invention provide a traveling vehicle provided with a forward-reverse switching lever that can reliably perform a switching operation of forward, neutral, and reverse positions and has excellent operability.

A traveling vehicle of one or more embodiments of the present invention is provided with a body that can travel, a steering wheel that is provided to the body and can rotate, and a forward-reverse switching lever that can switch to a forward position, a neutral position, and a reverse position, wherein the forward-reverse switching lever has a lever main body that can be pulled up at the neutral position and can swing forward or rearward in a pulled-up state and a grip mounted to an upper portion of the lever main body; the grip has a base portion having an upper face and a protruding portion protruding downward from the base portion; and the protruding portion has a distal face provided on an opposite side of a rotating-shaft side of the steering wheel, one side face that is provided on one side in the swinging direction and is continuous with the distal face, and another side face that is provided on another side in the swinging direction and is continuous with the distal face, the one side face and the other side face being formed so as to gradually approach each other in heading downward.

According to the above traveling vehicle, because operation is possible by interposing the protruding portion provided to the grip by two fingers, a force of holding the grip can be sufficiently obtained. As such, a switching operation of the forward-reverse switching lever can be reliably performed. Moreover, because the one side face and the other side face are formed so as to gradually approach each other in heading downward, when an operator applies force to the one side face or the other side face of the protruding portion with the finger to switch the forward-reverse lever, an upward force and a rearward force naturally arise. As such, the operator can swing the forward-reverse switching lever forward or rearward while pulling up on the forward-reverse switching lever without consciously performing a pulling-up operation and excellent operability is had.

DETAILED DESCRIPTION

Figure 1:
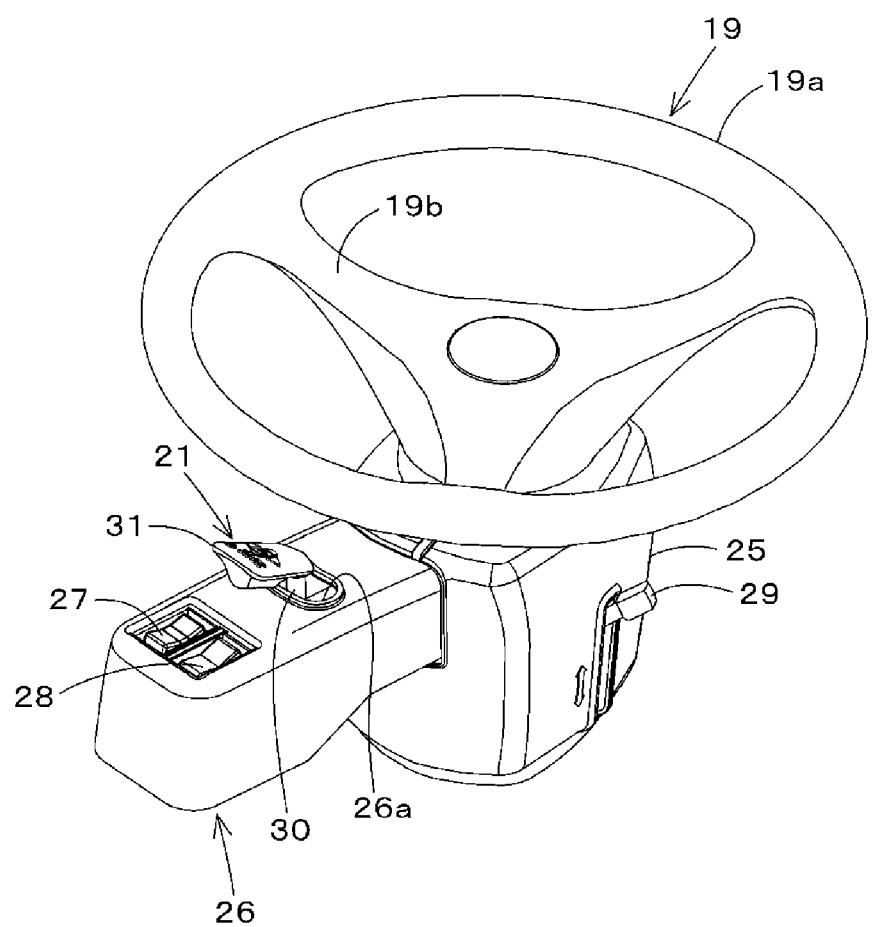
FIG. 1 is a perspective view of a vicinity of a steering wheel, a forward-reverse switching lever, and the like, according to one or more embodiments.

A traveling vehicle of one or more embodiments of the present invention is described below while referring to the drawings as appropriate.

Figure 20:
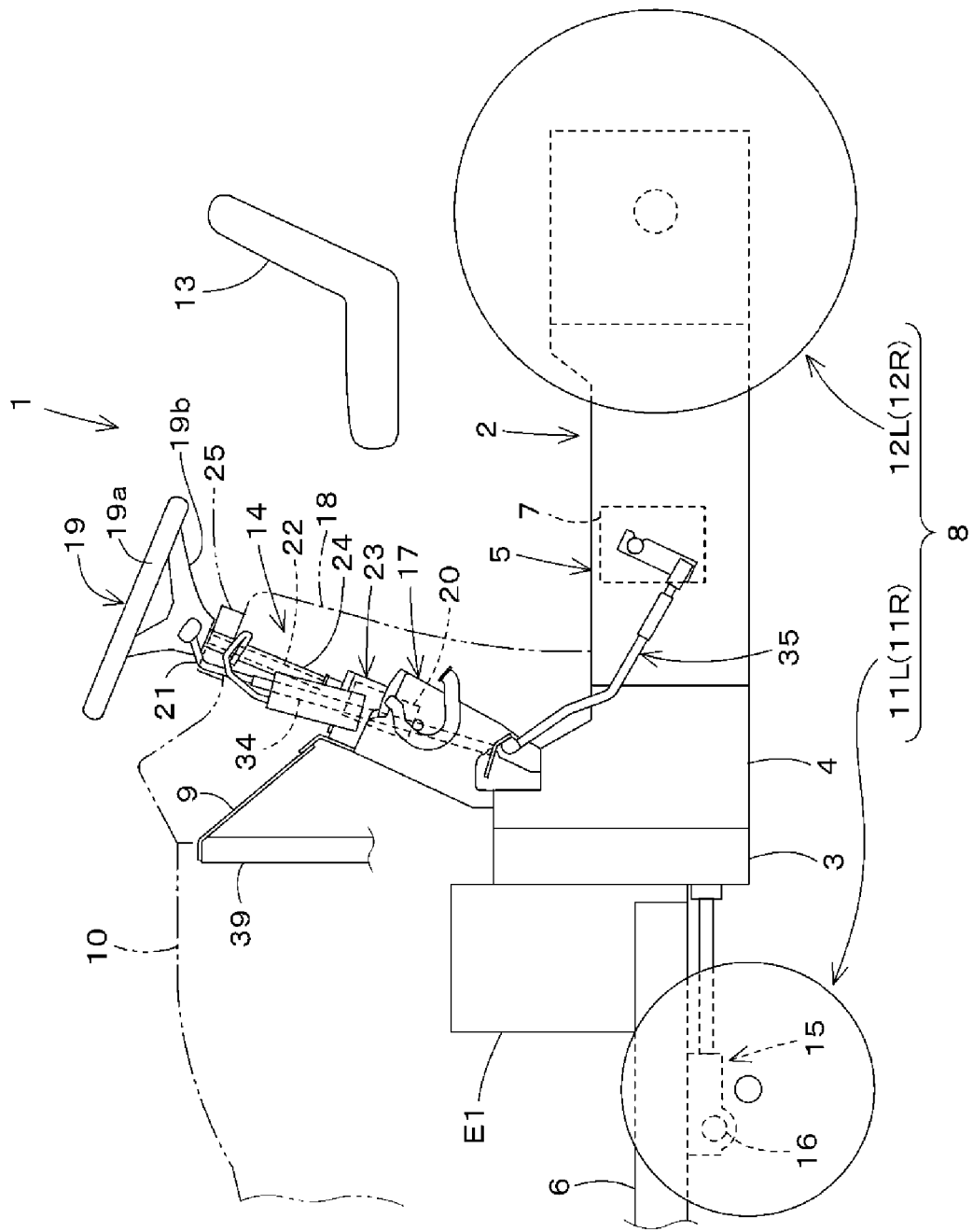
FIG. 20 is a side view of a traveling vehicle according to one or more embodiments.

FIG. 20 is a side view illustrating the traveling vehicle of one or more embodiments of the present invention. In one or more embodiments, the traveling vehicle is a tractor 1. However, the traveling vehicle is not limited to the tractor 1 and may be a work vehicle other than the tractor 1. For example, it may be an agricultural vehicle such as a combine or a planter or a construction vehicle such as a loader work machine. Moreover, it may be a passenger vehicle other than a work vehicle.

Hereinbelow, a front side of a driver seated in a driver's seat 13 of the tractor (traveling vehicle) 1 (left side in FIG. 20) is described as forward, a rear side of the driver (right side in FIG. 20) is described as rearward, a left side of the driver (near side in FIG. 20) is described as leftward, and a right side of the driver (far side in FIG. 20) is described as a rightward.

As illustrated in FIG. 20, the tractor 1 has a body 2 that can travel. The body 2 has an engine E1, a flywheel housing 3, a clutch housing 4, a transmission case 5, and a front-axle frame 6.

The engine E1 is a diesel engine. The engine E1 is positioned in a front portion of the tractor 1 and is covered by a hood 10. The engine E1 may be an electric motor or a hybrid type having a diesel engine and an electric motor.

The flywheel housing 3 is connected to a rear portion of the engine E1 and houses the flywheel.

The clutch housing 4 is connected to a rear portion of the flywheel housing 3. The clutch housing 4 houses a clutch that disengageably transmits power of the engine E1 transmitted via the flywheel.

The transmission case 5 is connected to a rear portion of the clutch housing 4. The transmission case 5 houses a transmission that shifts the power transmitted via the clutch. The transmission has a forward-reverse switching mechanism 7 that subjects power transmitted by the transmission to normal rotation or reverse rotation to switch to forward or reverse output.

The front-axle frame 6 is fixed to the engine E1 and protrudes forward from the engine E1. The front-axle frame 6 supports a front-axle case 15.

The tractor 1 has a traveling apparatus 8 that supports the body 2 in a manner that enables travel. The traveling apparatus 8 is a wheeled traveling apparatus having a plurality of front wheels provided in a front portion of the body 2 and a plurality of rear wheels provided in a rear portion of the body 2. The plurality of front wheels includes a left-front wheel 11L supported on a left side of the front-axle case 15 and a right-front wheel 11R supported on a right side of the front-axle case 15. The plurality of rear wheels includes a left-rear wheel 12L supported on a left side of the transmission case 5 and a right-rear wheel 12R supported on a right side of the transmission case 5. The traveling apparatus may be a semi-crawler traveling apparatus (a traveling apparatus having a front wheel and a crawler traveling mechanism adopted instead of a rear wheel).

The left-front wheel 11 and the right-front wheel 11R are steered wheels that can be steered by movement of a cylinder rod of a steering cylinder 16 disposed in a front portion of the front-axle case 15. An orientation of the body 2 can be changed (the body 2 can be steered) by subjecting the front wheels 11L, 11R to a steering operation. The steering cylinder 16 is configured by a hydraulic cylinder.

Of the front wheels 11L, 11R and the rear wheels 12L, 12R, at least the rear wheels 12L, 12R are driven wheels, power output from the transmission being transmitted to these driven wheels.

The driver's seat 13 wherein the driver is seated is mounted to the rear portion of the body 2. A control apparatus 14 is provided in front of the driver's seat 13. The control apparatus 14 has a control base 17 covered by a control cover 18. The control cover 18 is supported by a support frame 9. The support frame 9 is fixed to an upper portion of a support member 39 fixed to the body 2.

The steering base 17 has a bracket 23 erected on the body 2. The bracket 23 supports a steering wheel 19, a steering valve 20, a forward-reverse switching lever (shuttle lever) 21, and the like.

The steering wheel 19 is a member that operates steering of the body 2 and is manually operated by the driver. The steering wheel 19 has a grip portion 19a that the driver grasps and steers and a support portion 19b that supports this grip portion 19b on a rotating shaft (steering shaft) 22. In one or more embodiments, the grip portion 19a is formed in an annular shape.

The rotating shaft 22 is connected to a lower portion of the steering wheel 19 and extends downward. The rotating shaft 22 is inserted in a steering column 24 and is rotatably supported. A lower portion of the steering column 24 is fixed to the bracket 23. A vicinity of an upper portion of the steering column 24 is covered by a column cover 25 provided on an upper portion of the control cover 18.

The steering valve 20 is a valve that controls the steering cylinder 16. The steering valve 20 is a rotary valve that controls a flow rate of hydraulic oil and switches a direction of the hydraulic oil by being operated by the steering wheel 19. In other words, the steering valve 20 is a valve that can output the hydraulic oil, which transmits the operation of the steering wheel 19. To give a more detailed description, the steering valve 20 outputs the hydraulic oil according to an operation amount of the steering wheel 19 from a port corresponding to an operation direction. The hydraulic oil output from the steering valve 20 is sent to the steering cylinder 16 and moves the cylinder rod of the steering cylinder 16. This subjects the left-front wheel 11L and the right-front wheel 11R to the steering operation according to a rotation operation of the steering wheel 19.

The forward-reverse switching lever 21 is a member that performs an operation of switching a traveling direction of the body 2. To give a more detailed description, operating (swinging) the forward-reverse switching lever 21 forward or rearward switches the forward-reverse switching mechanism 7 and switches the traveling direction (advancing direction) of the body 2 to a forward direction or a reverse direction.

Figure 2:
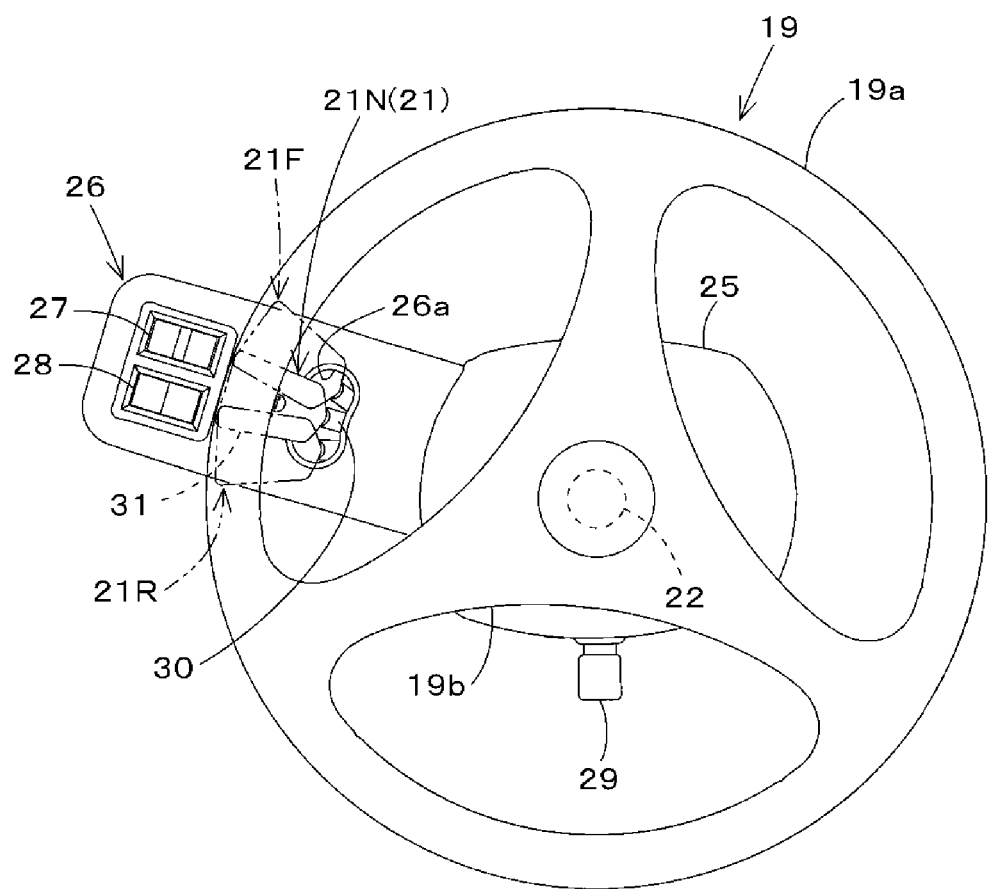
FIG. 2 is a plan view of the vicinity of the steering wheel, the forward-reverse switching lever, and the like, according to one or more embodiments.
Figure 3:
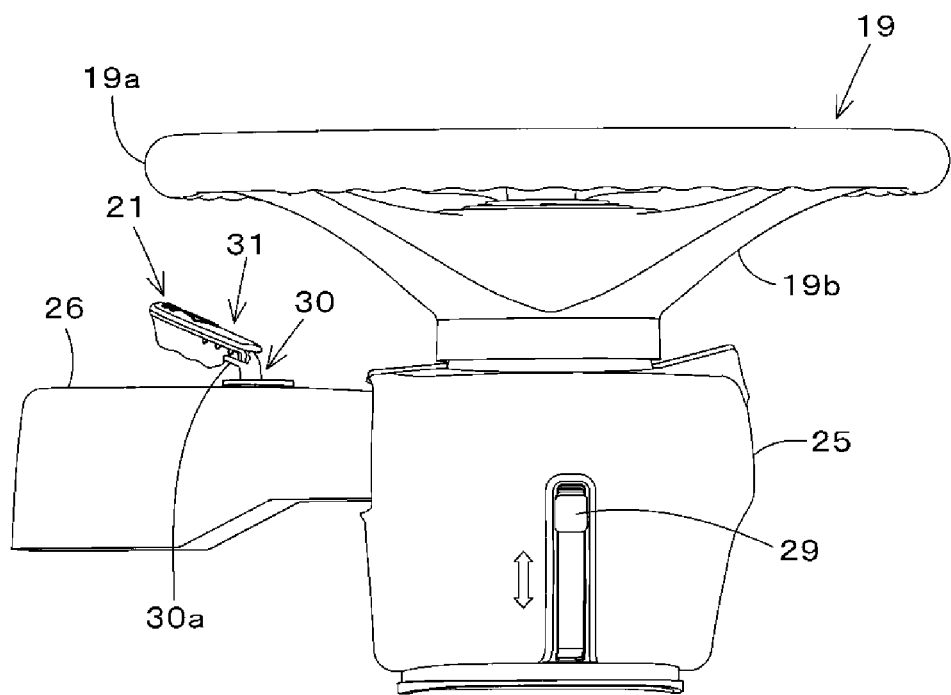
FIG. 3 is a back view of the vicinity of the steering wheel, the forward-reverse switching lever, and the like, according to one or more embodiments.

As illustrated in FIG. 1 to FIG. 3, a telescopic lever 29 is provided in a protruding manner in a front portion of the column cover 25. The telescopic lever 29 is a lever that adjusts a height of the steering wheel 19 and is disposed below the steering wheel 19.

A side cover 26 is installed on a side portion of the column cover 25. The side cover 26 is disposed below the steering wheel 19. The side cover 26 is extended from the side portion of the column cover 25 in a direction away from the rotating shaft 22. Specifically, the side cover 26 is installed on a left side portion of the column cover 25 and is extended from the left side portion so as to protrude leftward and frontward.

A first operation switch 27 and a second operation switch 28 are provided on an upper face of the side cover 26. In one or more embodiments, the first operation switch 27 is a windshield wiper/washer switch. The second operation switch 28 is a rear-window wiper/washer switch. The side cover 26 has an opening portion 26a in the upper face. The opening portion 26a is provided on a side closer to the rotating shaft 13 than the first operation switch 16 and the second operation switch 17.

The forward-reverse switching lever 21 is provided below the grip portion 19a of the steering wheel 19. The forward-reverse switching lever 21 can switch to a forward position, a neutral position, and a reverse position by swinging forward or rearward. In FIG. 2, the forward-reverse switching lever 21 in the neutral position is illustrated by reference sign 21N, the forward-reverse switching lever 21 in the forward position is illustrated by reference sign 21F, and the forward-reverse switching lever 21 in the reverse position is illustrated by reference sign 21R. Hereinbelow, a movement direction of the forward-reverse switching lever 21 illustrated in FIG. 2 (front-rear direction) is referred to as a "swinging direction of the forward-reverse switching lever 21."

When the forward-reverse switching lever 21 is in the neutral position, no power is output from the transmission to the traveling apparatus 8. When the forward-reverse switching lever 21 is operated to the forward position, the forward-reverse switching mechanism 7 enters a state of outputting forward power and the traveling direction of the body 2 is switched to the forward direction. When the forward-reverse switching lever 21 is operated to a reverse position R, the forward-reverse switching mechanism 7 enters a state of outputting reverse power and the traveling direction of the body 2 is switched to the reverse direction.

As illustrated in FIG. 1 to FIG. 4, the forward-reverse switching lever 21 has a lever main body 30 and a grip 31.

As illustrated in FIG. 4 to FIG. 7, the lever main body 30 has a first part 30a, a second part 30b, and a third part 30c. The first part 30a, the second part 30b, and the third part 30c may be formed from a single member or formed from a plurality of members and integrated by welding or the like.

The first part 30a is positioned in an upper portion of the lever main body 30. As illustrated in FIG. 3, the first part 30a is disposed above the side cover 26 and below the grip portion 19a of the steering wheel 19. The first part 30a is linear, one end portion being disposed on a rotating-shaft 13 side of the steering wheel 19 and another end portion being disposed on an opposite side of the rotating shaft 13 of the steering wheel 19. In other words, the first part 30a extends in a direction away from the rotating shaft 13 from the one end portion to the other end portion.

Figure 7:
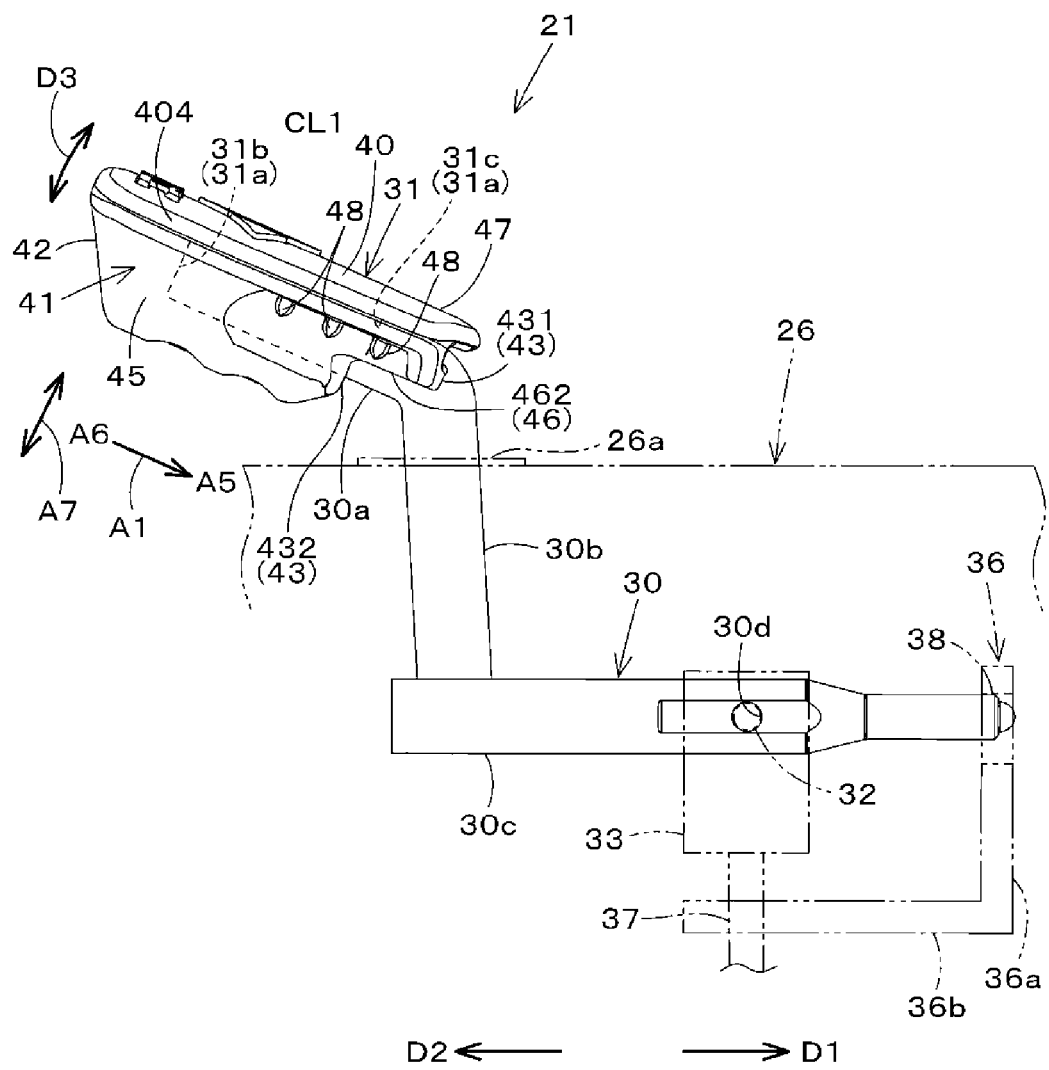
FIG. 7 is a diagram viewing the forward-reverse switching lever from the rear in a width direction of the grip according to one or more embodiments.

As illustrated in FIG. 7, the first part 30a extends at an incline, gradually moving upward in heading from a rotating-shaft 13 side (arrow D1 side) to the opposite side of the rotating shaft 13 (arrow D2 side). The second part 30b extends downward, bending from the other end portion of the first part 30a. The second part 30b extends through the opening portion 26a of the side cover 26. One end portion of the second part 30b is positioned outside (above) the side cover 26, and another end portion is positioned inside the side cover 26. The third part 30c is linear, one end side being connected to the other end portion (lower end portion) of the second part 30b; the third part 30c extends from this other end portion to the rotating-shaft 13 side (arrow D1 side).

Figure 4:
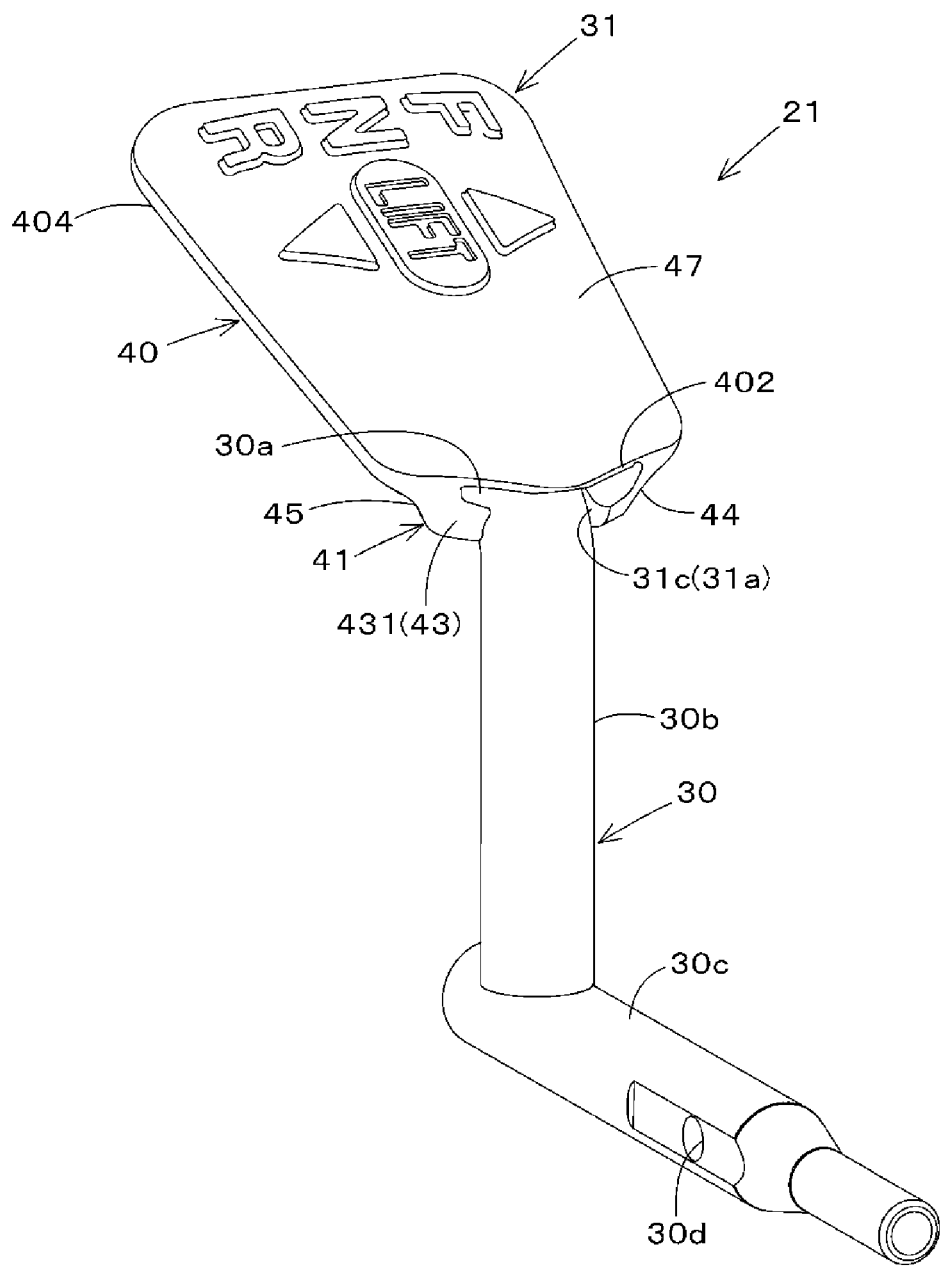
FIG. 4 is a perspective view viewing the forward-reverse switching lever from above on a proximal side according to one or more embodiments.
Figure 9:
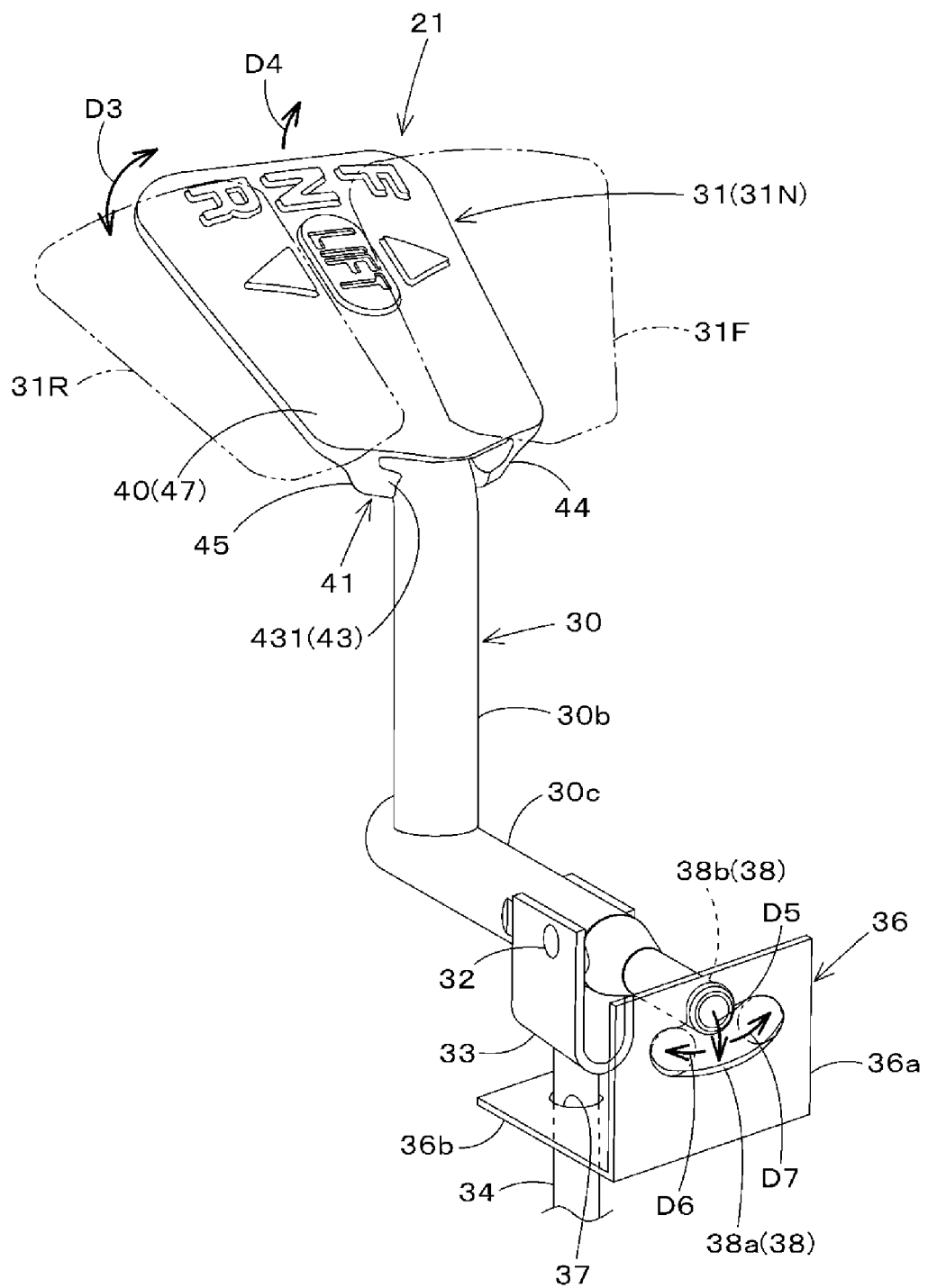
FIG. 9 is a perspective view describing an action of the forward-reverse switching lever according to one or more embodiments.

As illustrated in FIG. 4 and FIG. 7, a through hole 30d is provided in an intermediate portion in an extending direction of the third part 30c. As illustrated in FIG. 9, a pivot shaft 32 is inserted in the through hole 30d. The pivot shaft 32 pivotally supports a U-shaped installation member 33 on the third part 30c. An upper end portion of a support shaft 34 is installed to the installation member 33. The support shaft 34 extends downward from the installation member 33. A lower portion of the support shaft 34 is inserted in a cylindrical support cylinder (not illustrated) and rotatably supported around a shaft center by the support cylinder. The support shaft 34 rotates around the shaft center by swinging the forward-reverse switching lever 21 forward or rearward.

As illustrated in FIG. 20, one end side of a transmission member 35 is connected to the lower portion of the support shaft 34. Another end side of the transmission member 35 is connected to the forward-reverse switching mechanism 7. The transmission member 35 is a member that transmits the operation of the forward-reverse switching lever 21 to the forward-reverse switching mechanism 7.

When the forward-reverse switching lever 21 is operated to the forward position, this operation is transmitted to the forward-reverse switching mechanism 7 via the transmission member 35 and the forward-reverse switching mechanism 7 is switched to the state of outputting the forward power. When the forward-reverse switching lever 21 is operated to the reverse position, this operation is transmitted to the forward-reverse switching mechanism 7 via the transmission member 35 and the forward-reverse switching mechanism 7 is switched to the state of outputting the reverse power.

As illustrated by arrow D3 in FIG. 7 and FIG. 9, the lever main body 30 can swing upward or downward with the pivot shaft 32 as a fulcrum. Specifically, with the lever main body 30, when a first-part 30a side (grip 31 side) is raised with the pivot shaft 32 as a fulcrum, a third-part 30c side (opposite side of the grip 31) is lowered, and when the first-part 30a side is lowered, the third-part 30c side is raised. That is, the lever main body 30 can swing upward or downward together with the grip 31 with the pivot shaft 32 as the fulcrum. The lever main body 30 is biased by a spring (not illustrated) in a direction of lowering the grip 31 side. Therefore, an operation of swinging the lever main body 30 upward (pulling up on the lever main body 30) is performed by pulling up on the grip 31 against a biasing force of the spring.

The lever main body 30 can be swung upward (pulled up) against the biasing force of the spring when the forward-reverse switching lever 21 is in the neutral position and can swing forward or rearward in a pulled-up state. In other words, the lever main body 30 is regulated so as to be unable to be swung forward or rearward when the forward-reverse switching lever 21 is not in the neutral position. This regulating of the operation of the lever main body 30 is performed by a guide plate 36. The guide plate 36 is fixed to the bracket 23 that supports the steering wheel 19 and the like.

As illustrated in FIG. 9, the guide plate 36 is provided with a vertical plate 36a and a horizontal plate 36b. The vertical plate 36a extends in an up-down direction, one face facing the grip 21 side (one end side of the third part 30c) and another face facing the opposite side of the grip 21 (other end side of the third part 30c). The horizontal plate 36b extends from a lower portion of the vertical plate 36a to the grip 21 side (one end side of the third part 30c). The guide plate 36 has a through hole 37 and a guide groove 38. The through hole 37 is provided in the horizontal plate 36b and has the support shaft 34 inserted therethrough.

The guide groove 38 is provided in the vertical plate 36a and has a guiding portion 38a and a locking portion 38b. The guiding portion 38a extends in the front-rear direction (swinging direction of the front-reverse switching lever 21) and is formed in an arc shape. The locking portion 38b is formed as a groove extending upward from an intermediate portion of the guiding portion 38a in the front-rear direction. Another end portion of the third part 30c of the lever main body 30 is inserted in the guide groove 38. Note that although in one or more embodiments the other end portion of the third part 30c is directly inserted in the guide groove 38, another member may be installed to the other end portion of the third part 30c and this other member may be inserted in the guide groove 38. In this situation, a shape and a position of the guide plate 36 may be changed in correspondence with a shape, a position, and the like of the other member.

As illustrated in FIG. 9, the front-reverse switching lever 21 cannot swing forward or rearward when in the neutral position, illustrated by reference sign 31N, because the other end portion of the third part 30c is locked in the locking portion 38b. When the forward-reverse switching lever 21 is swung upward at the neutral position as illustrated by arrow D4 (when the grip 31 side of the lever main body 30 is pulled up), as illustrated by arrow D5, the other end portion of the third part 30c is disengaged from the locking portion 38b. As such, the other end portion becomes able to move along the guiding portion 38a as illustrated by arrows D6, D7 and the virtual lines. As such, the forward-reverse switching lever 21 can swing in the front-rear direction. Specifically, when a grip 31 side of the forward-reverse lever 21 is swung forward (moved to the position illustrated by reference sign 31F), the other end portion of the third part 30c moves rearward (in the direction of arrow D6). When the grip 31 side of the forward-reverse lever 21 is swung rearward (moved to the position illustrated by reference sign 31R), the other end portion of the third part 30c moves forward (in the direction of arrow D7).

As described above, the lever main body 30 can be pulled up at the neutral position and swung forward or rearward in the pulled-up state. A pulling operation and a swinging operation of the lever main body 30 can be performed by the driver (operator) seated in the driver's seat 13 grasping the grip 31.

The grip 31 is described in detail below.

As illustrated in FIG. 4 to FIG. 7 and the like, the grip 31 is mounted to the upper portion of the lever main body 30. The grip 31 is a portion the operator grasps when operating the forward-reverse switching lever 21.

Figure 6:
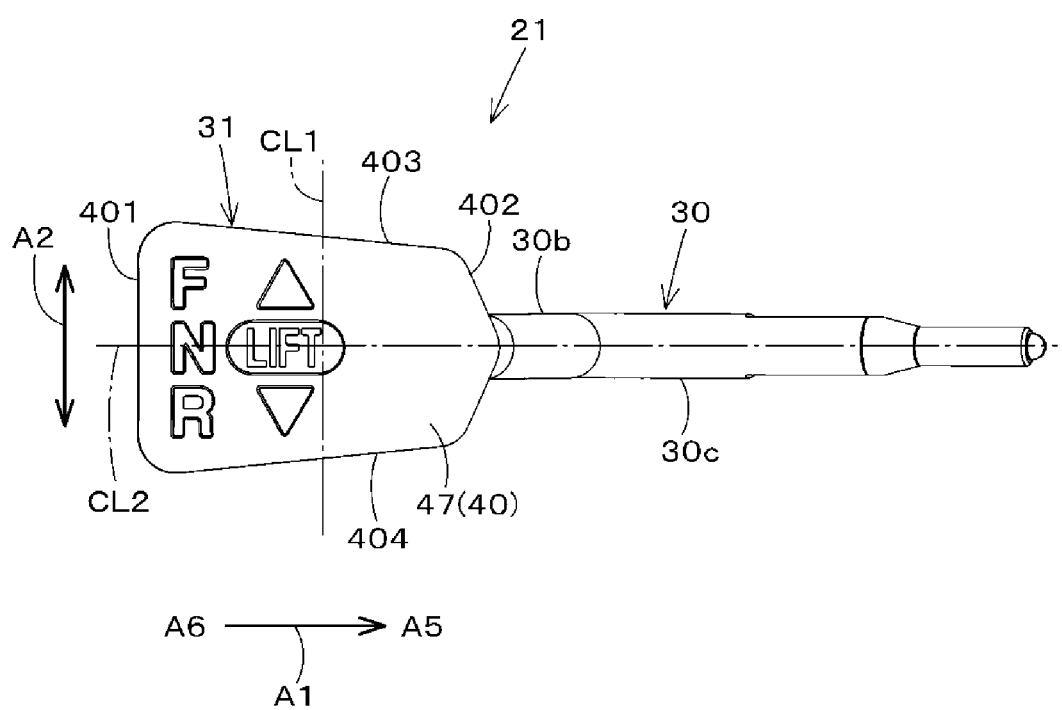
FIG. 6 is a diagram viewing the forward-reverse switching lever from above in a thickness direction of a grip according to one or more embodiments.
Figure 8:
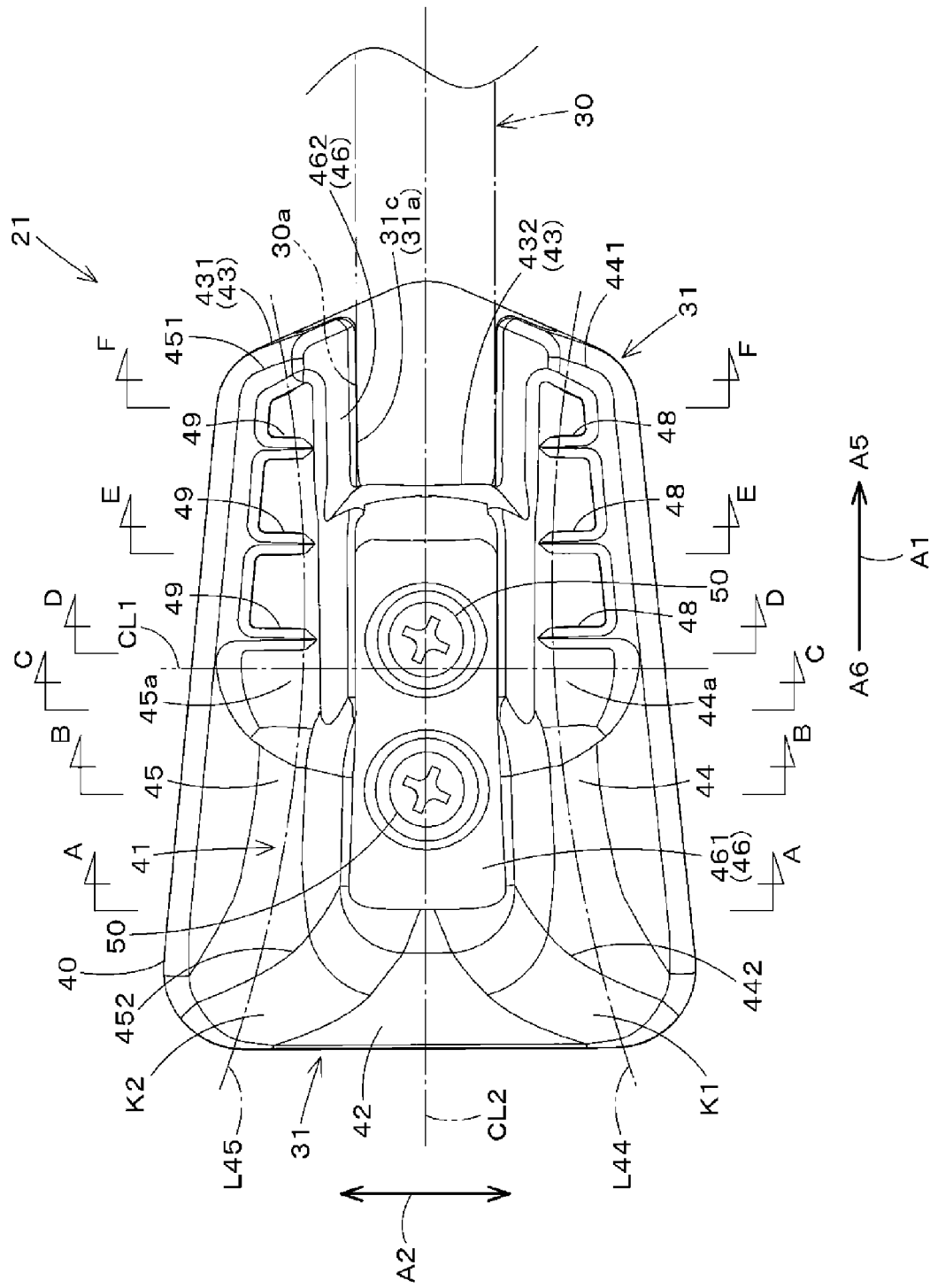
FIG. 8 is a diagram viewing the forward-reverse switching lever from below in the thickness direction of the grip according to one or more embodiments.
Figure 10:
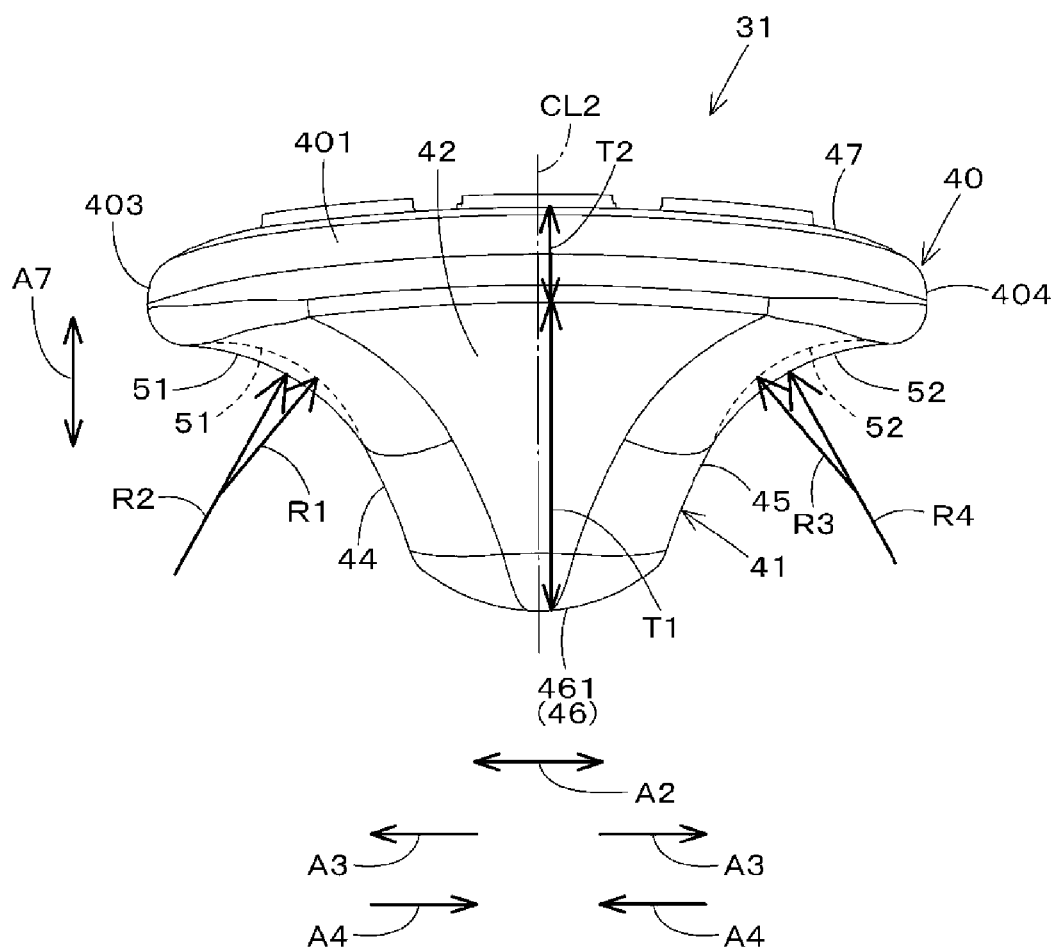
FIG. 10 is a diagram viewing the grip from the distal side according to one or more embodiments.
Figure 11:
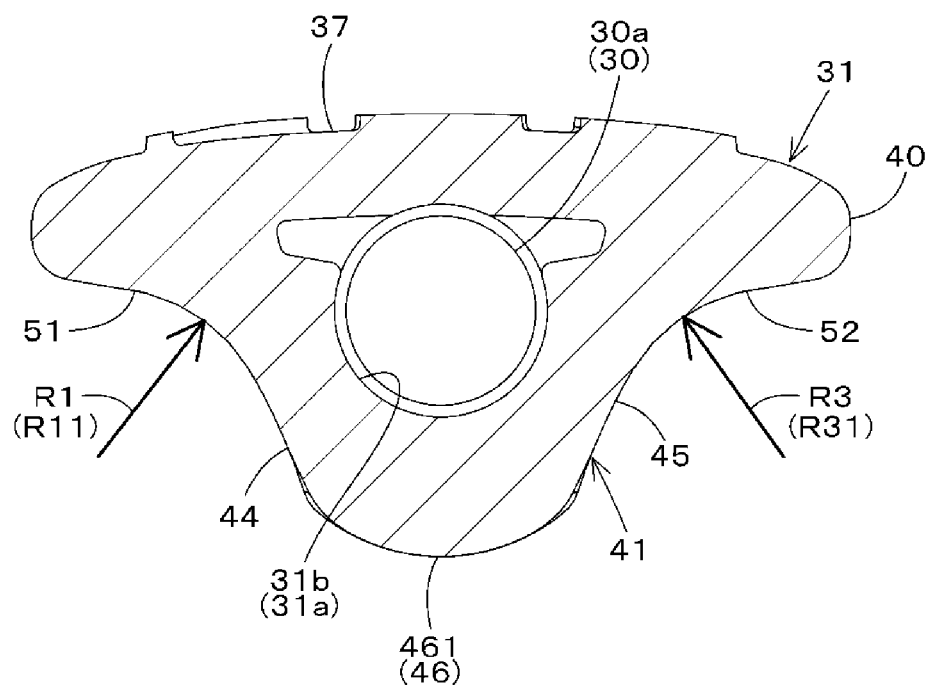
FIG. 11 is a cross-sectional view at line A-A in FIG. 8.

In the description relating to the grip 31 below, the direction illustrated by arrow A1 in FIG. 6 to FIG. 8 is referred to as a "depth direction." The depth direction A1 is a direction orthogonal to the swinging direction of the front-reverse switching lever 21 (front-rear direction). In other words, the depth direction A1 is a direction heading from an opposite side of the rotating-shaft 22 side of the steering wheel 19 to the rotating-shaft 22 side. That is, the depth direction A1 is a direction heading from the other end portion to the one end portion of the first part 30a of a lever shaft 31. Moreover, a swinging direction (front-rear direction) A2 of the forward-reverse switching lever 21 illustrated in FIG. 6, FIG. 8, and FIG. 10 is referred to as a "width direction." The width direction A2 is a direction orthogonal to the depth direction A1. Moreover, a center CL1 of the grip 31 in the depth direction A1 illustrated in FIG. 6 and FIG. 8 is referred to as a "depth-direction center" and a center CL2 of the grip 31 in the width direction A2 illustrated in FIG. 6, FIG. 8, and FIG. 10 is referred to as a "width-direction center." Moreover, a direction A3 that is the width direction A2 illustrated in FIG. 10 and is a direction away from the width-direction center CL2 is referred to as "outward" and a direction A4 that is the width direction A2 and is a direction approaching the width-direction center CL2 is referred to as "inward." Moreover, a rotating-shaft 22 side in the depth direction A1 illustrated in FIG. 6 to FIG. 8 (A5 side) is referred to as a "proximal side" and an opposite side of the rotating-shaft 22 side in the depth direction A1 (A6 side) is referred to as a "distal side." Moreover, a direction A7 that heads from above to below or from below to above as illustrated in FIG. 7 and FIG. 10 and is orthogonal to the depth direction A1 and the width direction A2 is referred to as a "thickness direction."

Figure 5:
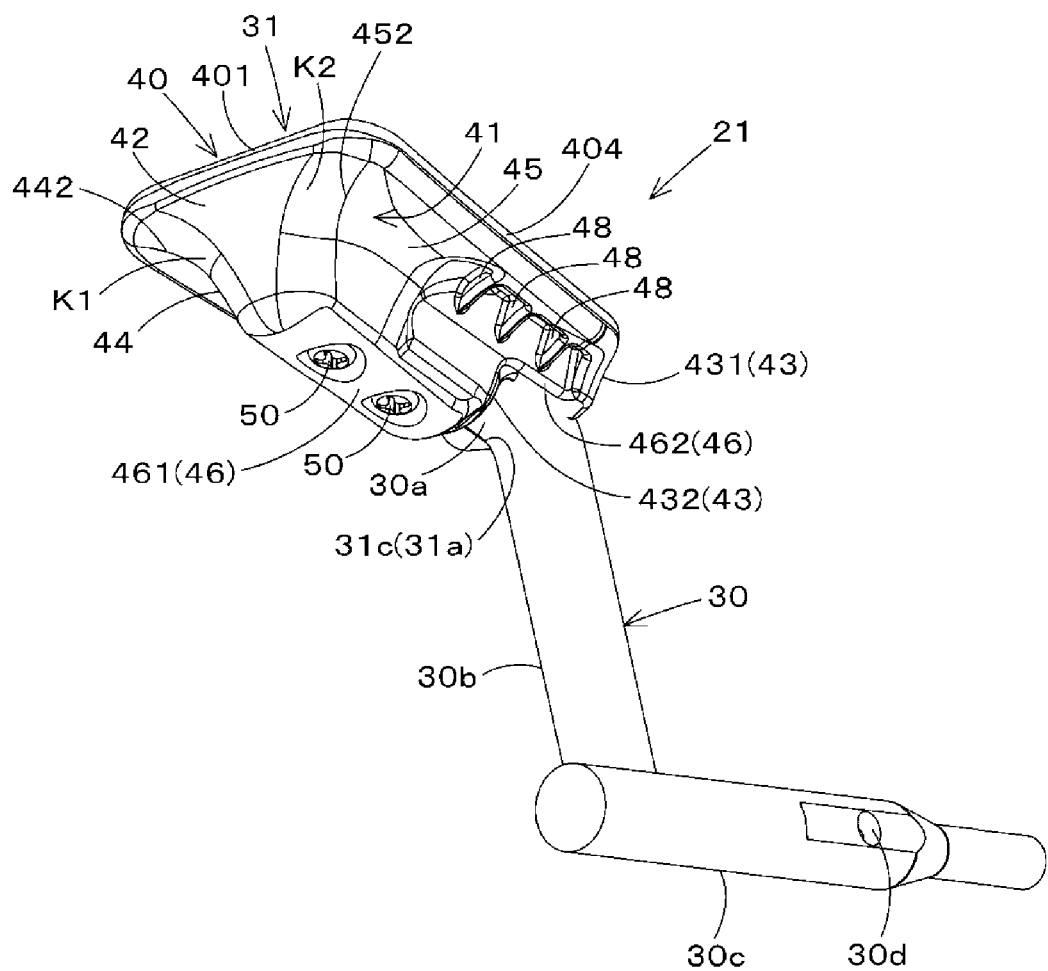
FIG. 5 is a perspective view viewing the forward-reverse switching lever from below on a distal side according to one or more embodiments.

As illustrated in FIG. 5, FIG. 7, FIG. 10, and the like, the grip 31 has a base portion 40 having an upper face 47 and a protruding portion 41 protruding downward from the base portion 40. The base portion 40 and the protruding portion 41 are integrally formed, the base portion 40 configuring an upper portion of the grip 31 and the protruding portion 41 configuring a lower portion of the grip 31.

As illustrated in FIG. 6, a linear first edge portion 401 extending in the width direction A2 is provided on a distal side of the base portion 40. A second edge portion 402 is provided on a proximal side of the base portion 40. The second edge portion 402 is formed substantially in a V shape that moves to the proximal side in heading from an outward side to an inward side. A linear third edge portion 403 that connects a front portion of the first edge portion 401 a front portion of the second edge portion 402 is provided on a front side of the base portion 40. A linear fourth edge portion 404 that connects a rear portion of the first edge portion 401 a rear portion of the second edge portion 402 is provided on a rear side of the base portion 40. A distance between the third edge portion 403 and the fourth edge portion 404 gradually widens in heading from the proximal side to the distal side. A boundary portion of the first edge portion 401 and the third edge portion 403, a boundary portion of the first edge portion 401 and the fourth edge portion 404, a boundary portion of the second edge portion 402 and the third edge portion 403, and a boundary portion of the second edge portion 402 and the fourth edge portion 404 are each formed in a curved shape. In one or more embodiments, the base portion 40 is formed in a substantially pentagonal shape in a top view viewed from above in the thickness direction A7 by the first edge portion 401 to the fourth edge portion 404, but the base portion 40 may be formed in another shape such as a substantially rectangular shape.

The upper face 47 of the base portion 40 configures an upper face of the grip 31. As illustrated in FIG. 7, the upper face 47 is inclined so as to move downward in heading from the distal side A6 to the proximal side A5. Moreover, as illustrated in FIG. 10, the upper face 21 is formed in a curved shape where a center in the width direction A2 is raised from one side (front side) and another side (rear side) in the width direction A2. In other words, the upper face 21 is formed in an upwardly convex arc shape as viewed from the depth direction A1.

As illustrated in FIG. 4, FIG. 6, and the like, the letter "F," signifying forward; the letter "N," signifying neutral; and the letter "R," signifying reverse, are displayed on the upper face 21. The letter "F" is displayed on one side (front side) in the swinging direction of the forward-reverse switching lever 21 on the upper face 21 of the grip 31. The letter "R" is displayed on another side (rear side) in the swinging direction of the forward-reverse switching lever 21 on the upper face 21 of the grip 31. The letter "N" is displayed between the letter "F" and the letter "R." Moreover, the letters "LIFT" are displayed on a grip proximal side of the letter "N." A symbol indicating a forward direction (triangular arrow) is displayed on a grip proximal side of the letter "F." A symbol indicating a rearward direction (triangular arrow) is displayed on a grip proximal side of the letter "R."

In one or more embodiments, the above letters and symbols are displayed by convex portions protruding from the upper face 21 but may be displayed by, for example, affixing a sticker printed with the letters and symbols on the upper face 21.

By viewing the letters and symbols displayed on the upper face of the grip 31, the operator can accurately perform the operation of pulling up on the forward-reverse switching lever 21 at the neutral position and afterward switching to the forward position, the neutral position, or the reverse position.

As illustrated in FIG. 4, FIG. 5, FIG. 7, FIG. 8, FIG. 10, and the like, the protruding portion 41 has a distal face 42, a proximal face 43, one side face 44, another side face 45, and a lower face 46.

The distal face 42 is a face provided on a distal side of the protruding portion 41 (opposite side of the rotating-shaft 22 side of the steering wheel 19). As illustrated in FIG. 7, the distal face 42 is formed as an inclined face that moves to the proximal side A5 in approaching the lower face 46 (in heading downward in the thickness direction A7). An upper portion of the distal face 42 is connected to the first edge portion 401 of the base portion 40 by a smooth, curved face.

The proximal face 43 is a face provided on a proximal side of the protruding portion 41 (rotating-shaft 22 side of the steering wheel 19). As illustrated in FIG. 5, FIG. 7, and FIG. 8, the proximal face 43 has a first proximal face 431 positioned at a proximal end of the grip 31 and a second proximal face 432 positioned in an intermediate portion of the grip 31 in the depth direction A1. An upper portion of the first proximal face 431 is connected to the second edge portion 402 of the base portion 40 by a smooth, curved face.

The one side face 44 is a face provided on the one side in the swinging direction of the forward-reverse switching lever 21. In other words, the one side face 44 is a face provided on the one side (front side) in the width direction A2. The one side face 44 configures a front face of the protruding portion 41. An upper portion of the one side face 44 is connected to the third edge portion 403 of the base portion 40 by a smooth, curved face.

The other side face 45 is a face provided on the other side (rear side) in the swinging direction of the forward-reverse switching lever 21. In other words, the other side face 45 is a face provided on the other side in the width direction A2. The other side face 45 configures a rear face of the protruding portion 41. An upper portion of the other side face 45 is connected to the fourth edge portion 404 of the base portion 40 by a smooth, curved face.

As illustrated in FIG. 5 and FIG. 10, the one side face 44 and the other side face 45 are formed so as to gradually approach each other in heading downward. In other words, the one side face 44 and the other side face 45 are formed so as to move inward in heading downward (downward in the thickness direction A7). As illustrated in FIG. 10, the one side face 44 and the other side face 45 are formed to be symmetrical across the width-direction center CL2. The protruding portion 41 is formed in a downwardly convex shape as viewed from the depth direction A1 and protrudes the most at the width-direction center CL2.

As illustrated in FIG. 8, the one side face 44 has one proximal portion 441 positioned on the proximal side (rotating-shaft 22 side) and one distal portion 442 positioned on the distal side (opposite side of the rotating-shaft 22 side). In one or more embodiments, the one proximal portion 441 is a right end portion of the one side face 44 and the one distal portion 442 is a left end portion of the one side face 44.

As illustrated in FIG. 8, the other side face 45 has another proximal portion 451 positioned on the proximal side (rotating-shaft 22 side of the steering wheel 19) and another distal portion 452 positioned on the distal side (opposite side of the rotating-shaft 22 side). In one or more embodiments, the other proximal portion 451 is a right end portion of the other side face 45 and the other distal portion 452 is a left end portion of the other side face 45.

As illustrated in FIG. 5 and FIG. 8, the one side face 44 and the other side face 45 are continuous with (connected to) the distal face 42. Specifically, the one side face 44 is continuous with the distal face 42 at the one distal portion 442. The other side face 45 is continuous with the distal face 42 at the other distal portion 452. Both a boundary portion K1 between the one distal portion 442 and the distal face 42 and a boundary portion K2 between the other distal portion 452 and the distal face 42 are formed as a smooth, curved face.

Furthermore, the one side face 44 and the other side face 45 are continuous with (connected to) the proximal face 43. Specifically, the one side face 44 is continuous with the first proximal face 431 at the one proximal portion 441. Moreover, the one side face 44 is continuous with the second proximal face 432 at an intermediate portion between the one proximal portion 441 and the one distal portion 442. The other side face 45 is continuous with the first proximal face 431 at the other proximal portion 451. Moreover, the other side face 45 is continuous with the second proximal face 432 at an intermediate portion between the other proximal portion 451 and the other distal portion 452.

As described above, the one side face 44 and the other side face 45 of the protruding portion 41 are continuous with the distal face 42 and the proximal face 43. In other words, the protruding portion 41 is provided over an entire length of the grip 31 in the depth direction A1. However, it is sufficient for the one side face 44 and the other side face 45 of the protruding portion 41 to be continuous with at least the distal face 42, and the one side face 44 and the other side face 45 of the protruding portion 41 do not have to be continuous with the proximal face 43. That is, the protruding portion 41 does not have to be provided over the entire length of the grip 31 in the depth direction A1 and may be provided only in a range from a distal side to an intermediate portion in the depth direction A1.

As illustrated in FIG. 10 to FIG. 13, the one side face 44 has a first curved portion 51 that is recessed toward an other-side-face 45 side in moving downward. The other side face 45 has a second curved portion 52 that is recessed toward a one-side-face 44 side in moving downward. The first curved portion 51 and the second curved portion 52 are recessed in a direction of approaching each other as viewed from the depth direction A1. More specifically, the first curved portion and the second curved portion 52 are curved in an arc shape that is upwardly and inwardly convex. The first curved portion 51 and the second curved portion 52 are formed in a base area of the protruding portion 41 (area of the protruding portion 41 connecting to the base portion 40).

In FIG. 10, the first curved portion 51 and the second curved portion 52 at the one distal portion 442 are illustrated by the solid lines and the first curved portion 51 and the second curved portion 52 at the intermediate portion between the one proximal portion 441 and the one distal portion 442 (position at a cross section at B-B in FIG. 8) are illustrated by the dashed lines.

As illustrated in FIG. 10, with the first curved portion 51, a curvature radius R1 at the intermediate portion between the one proximal portion 441 and the one distal portion 442 is smaller than a curvature radius R2 at the one distal portion 442 (R2>R1). Moreover, with the second curved portion 52, a curvature radius R3 at the intermediate portion between the other proximal portion 451 and the other distal portion 452 is smaller than a curvature radius R4 at the other distal portion 452 (R4>R3).

To give a more detailed description, as illustrated in FIG. 8 and FIG. 10 to FIG. 12, the curvature radius R1 at the intermediate portion between the one proximal portion 441 and the one distal portion 442 gradually decreases in heading from the one distal portion 442 to the depth-direction center CL1. That is, in FIG. 10 to FIG. 12, R2>R11>R12. Note that the curvature radiuses R11 and R12 are curvature radiuses at intermediate portions between the one proximal portion 441 and the one distal portion 442 and are therefore concepts (subordinate concepts) included in the curvature radius R1.

Furthermore, the curvature radius R3 at the intermediate portion between the other proximal portion 451 and the other distal portion 452 gradually decreases in heading from the other distal portion 452 to the depth-direction center CL1. That is, in FIG. 10 to FIG. 13, R4>R31>R32. Note that the curvature radiuses R31 and R32 are curvature radiuses at intermediate portions between the other proximal portion 451 and the other distal portion 452 and are therefore concepts (subordinate concepts) included in the curvature radius R3.

In other words, a curvature radius of the first curved portion 51 and a curvature radius of the second curved portion 52 increase in heading from the intermediate portion of the grip 31 in the depth direction A1 to the distal side. Moreover, the curvature radius of the first curved portion 51 and the curvature radius of the second curved portion 52 increase in heading from the intermediate portion of the grip 31 in the depth direction A1 to the proximal side. That is, the curvature radius of the first curved portion 51 and the curvature radius of the second curved portion 52 are the smallest at the intermediate portion of the grip 31 in the depth direction A1.

A position whereat the curvature radius of the first curved portion 51 is the smallest and a position whereat the curvature radius of the second curved portion 52 is the smallest are the same position in the depth direction A1. The position whereat the curvature radius of the first curved portion 51 is the smallest and the position whereat the curvature radius of the second curved portion 52 is the smallest are provided at the depth-direction center CL1 but may be provided in a position shifted forward or rearward from the depth-direction center CL1 in one or more embodiments.

As illustrated in FIG. 8 and FIG. 13 to FIG. 15, on the proximal side of the depth-direction center CL1 of the grip 31, a first recessed portion 51a is formed in the first curve portion 51 and a second recessed portion 52a is formed in the second curved portion 52. In one or more embodiments, the first recessed portion 51a and the second recessed portion 52a are also formed in a range from a position slightly in front of the depth-direction center CL1 (position of a cross section at C-C in FIG. 8) to the depth-direction center CL1. The first recessed portion 51a and the second recessed portion 52a are recessed in a diagonally upward manner, boring into the base portion 40 at the base area of the protruding portion 41. A depth of the first concave portion 51a and the second concave portion 52a becomes deeper in heading from the distal side to the proximal side.

As illustrated in FIG. 5, FIG. 7, FIG. 8, and FIG. 12 to FIG. 15, the one side face 44 is provided with a first rib 48. The other side face 45 is provided with a second rib 49. With the first rib 48 and the second rib 49, a plurality (in one or more embodiments, three) is provided at intervals in the depth direction A1. The first rib 48 and the second rib 49 are provided in symmetrical positions across the width-direction center CL2. The first rib 48 and the second rib 49 are provided on the proximal side of the depth-direction center CL1. In other words, the first rib 48 is provided on a proximal side of the position whereat the curvature radius of the first curve portion 51 is the smallest. Moreover, the second rib 49 is provided on a proximal side of the position whereat the curvature radius of the second curved portion 52 is the smallest. The first rib 48 is provided extending from an upper portion to a lower portion of the first curved portion 51 of the one side face 44. The second rib 49 is provided extending from an upper portion to a lower portion of the second curved portion 52 of the other side face 45. The first rib 48 reinforces the one side face 44 of the grip 31. The second rib 49 reinforces the other side face 45 of the grip 31. Moreover, the first rib 48 and the second rib 49 also have an anti-slip function of preventing slipping of the finger when the protruding portion 41 of the grip 31 is grasped by the finger.

As illustrated by the dot-dash lines L44, L45 in FIG. 8, in a bottom view viewed from a downward side in the thickness direction A7 ("bottom view"), the one side face 44 and the other side face 45 gradually separate in heading from the depth-direction center CL1 to the distal side or the proximal side. In other words, with the protruding portion 41, in the bottom view, the depth-direction center CL1 is inwardly constricted. Specifically, the one side face 44 has a first constricted portion 44a and the other side face 45 has a second constricted portion 45a. The first constricted portion 44a is recessed toward the other-side-face 45 side in the bottom view. The second constricted portion 45a is recessed toward the one-side-face 44 side in the bottom view.

A position whereat the constriction of the first constricted portion 44a is the largest and a position whereat the constriction of the second constricted portion 45a is the largest are the same position in the depth direction A1. In the bottom view, a distance between the one side face 44 and the other side face 45 is the smallest at the depth-direction center CL1 and increases in moving away from the depth-direction center CL1 (in heading to the distal side or the proximal side).

As illustrated in FIG. 6 to FIG. 8, FIG. 10, and the like, a lower end portion of the distal face 42, a lower end portion of the proximal face 43, a lower end portion of the one side face 44, and a lower end portion of the other side face 45 are connected by the lower face 46. As illustrated in FIG. 5 and FIG. 7, the lower face 46 is formed having a step as viewed from the width direction A2. In other words, as viewed from the width direction A2, the grip 31 has a first bottom face 461 whose distance to the upper face 46 is large and a second bottom face 462 whose distance to the upper face 46 is small. The first bottom face 461 is provided on a proximal side of the grip 31. The second bottom face 462 is provided on a distal side of the grip 31. As illustrated in FIG. 7, both a first lower face 412 and the second bottom face 461 are inclined so as to move downward in heading from the distal side to the proximal side. As illustrated in FIG. 5, FIG. 10, and the like, as viewed from the depth direction A1, a first lower face 461 is formed in a curved face of a downwardly convex arc shape, the width-direction center CL2 being positioned the lowest. As illustrated in FIG. 5 and FIG. 7, the second bottom face 462 connects the first proximal face 431 and the second proximal face 432.

As illustrated in FIG. 10, a thickness (length in the thickness direction A7) T1 of the protruding portion 41 is greater than a thickness T2 of the base portion 40. In one or more embodiments, the thickness T1 of the protruding portion 41 is no less than twice as large as the thickness T2 of the base portion 40. In one or more embodiments, the thickness T1 of the protruding portion 41 is no less than three times as large as the thickness T2 of the base portion 40. By making the thickness T1 of the protruding portion 41 greater than the thickness T2 of the base portion 40, grasping can be performed reliably and easily when grasping the protruding portion 41 by the finger.

As illustrated in FIG. 4, FIG. 5, FIG. 7, FIG. 8, and FIG. 11 to FIG. 16, the grip 31 has an engaging portion 31a. The engaging portion 31a is provided in the protruding portion 41. Specifically, the engaging portion 31a is provided between the one side face 44 and the other side face 45 of the protruding portion 41. The engaging portion 31a engages the lever main body 30.

The engaging portion 31a has an engaging hole 31b and an engaging groove 31c. The engaging hole 31b and the engaging groove 31c are continuously provided in the depth direction A1. The engaging hole 31b is provided above the first bottom face 461 of the grip 31. The engaging hole 31b is a hole of a substantially circular cross section and is open at the second proximal face 432 of the proximal face 43 but not open at the distal face 42. That is, the engaging hole 31b is a non-through hole whose entrance is the second proximal face 432. The engaging groove 31c is provided in the second bottom face 462 of the grip 31. The engaging groove 31c is a groove that is upwardly recessed from the second bottom face 462. The engaging groove 31c is extended from the first proximal face 431 to the second proximal face 432 of the proximal face 43 and is connected to the engaging hole 31b.

The engaging portion 31a engages the first part 30a of the lever main body 30. The first part 30a of the lever main body 30 is engaged by the engaging portion 31a and extends from the proximal side to the distal side. The first part 30a is fitted in the engaging groove 31c on the proximal side and inserted in the engaging hole 31b on the distal side.

Figure 12:
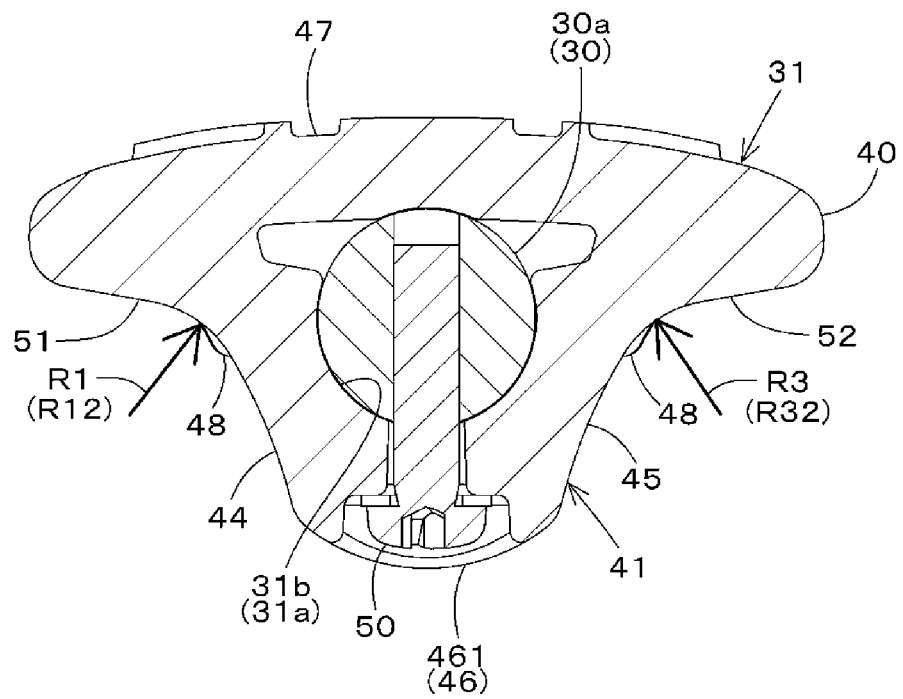
FIG. 12 is a cross-sectional view at line B-B in FIG. 8.
Figure 13:
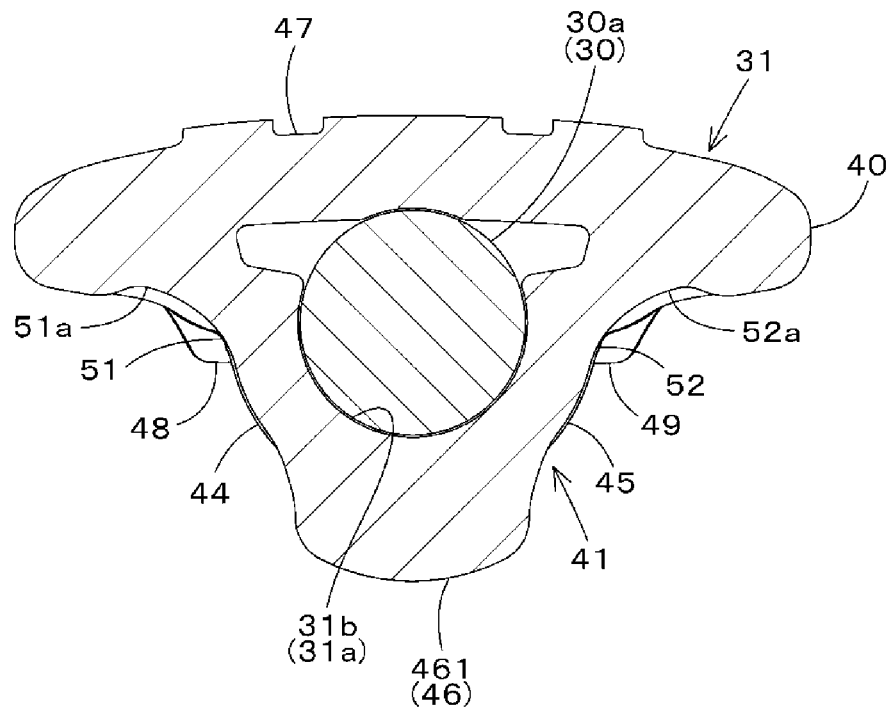
FIG. 13 is a cross-sectional view at line C-C in FIG. 8.
Figure 14:
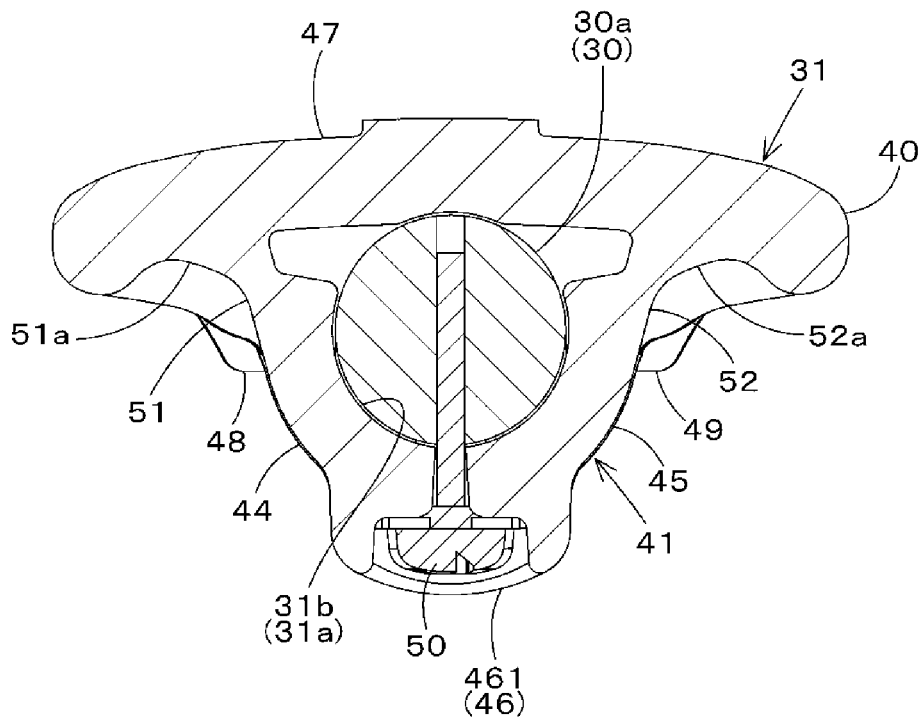
FIG. 14 is a cross-sectional view at line D-D in FIG. 8.
Figure 15:
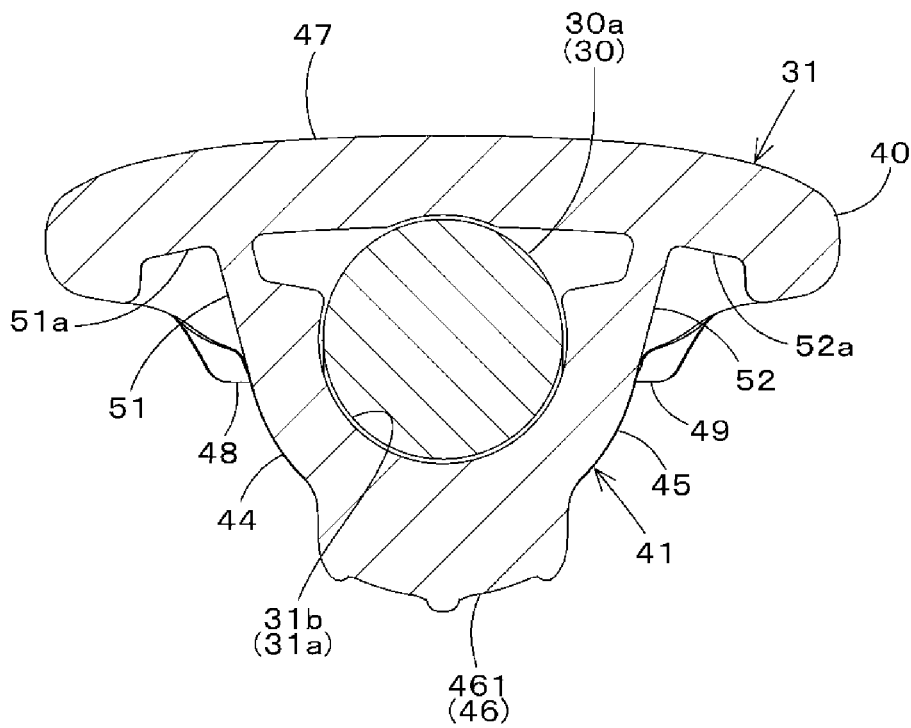
FIG. 15 is a cross-sectional view at line E-E in FIG. 8.
Figure 16:
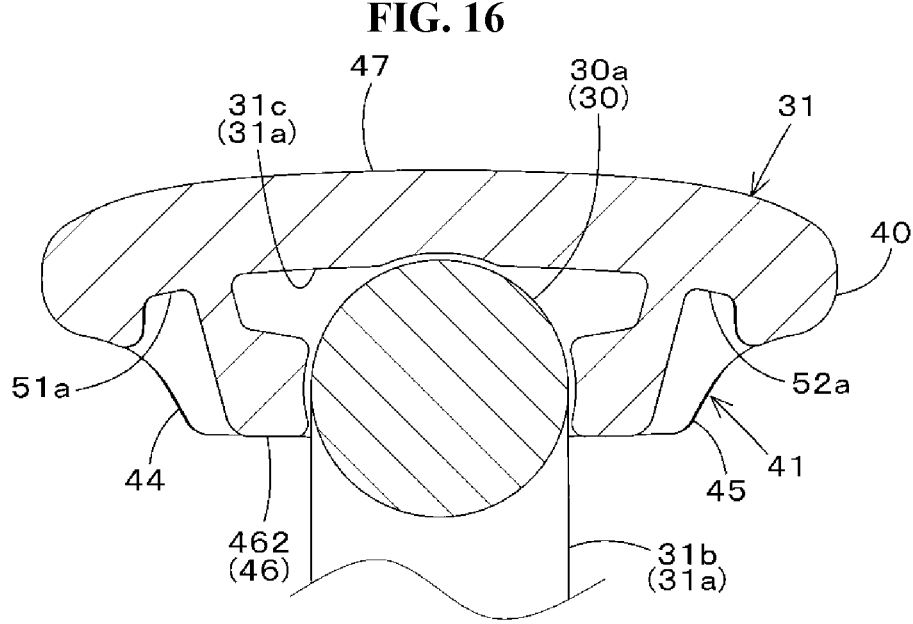
FIG. 16 is a cross-sectional view at line F-F in FIG. 8.

As illustrated in FIG. 5, FIG. 8, FIG. 12, and the like, the first part 30a is fixed to the grip 31 by a fixing member 50. The fixing member 50 is a screw, a bolt, or the like and is inserted in a hole provided in the first bottom face 461 of the grip 31 and fixed to the first part 30a. With the fixing member 50, a plurality (two) is provided lined up in the depth direction A1.

In this manner, because the grip 31 has the engaging portion 31a between the one side face 44 and the other side face 45 and the lever main body 30 is engaged by the engaging portion 31a, the grip 31 and the lever main body 30 can be easily and reliably fixed. As such, a force applied to the grip 31 can be reliably transmitted to the lever main body 30.

Actions and effects of the traveling vehicle 1 of one or more embodiments are described below.

In the above traveling vehicle 1, the driver (operator) seated in the driver's seat 13 operates the forward-reverse switching lever 21 with another finger of one hand (in one or more embodiments, the left hand) while rotating a vicinity of a base of the thumb of this one hand in a state where the thumb is hooked on the steering wheel 19. The operation of the forward-reverse switching lever 21 is performed by two fingers other than the thumb (for example, the index finger and the middle finger or the middle finger and the ring finger) by interposing the protruding portion 41 of the grip 31.

Figure 17:
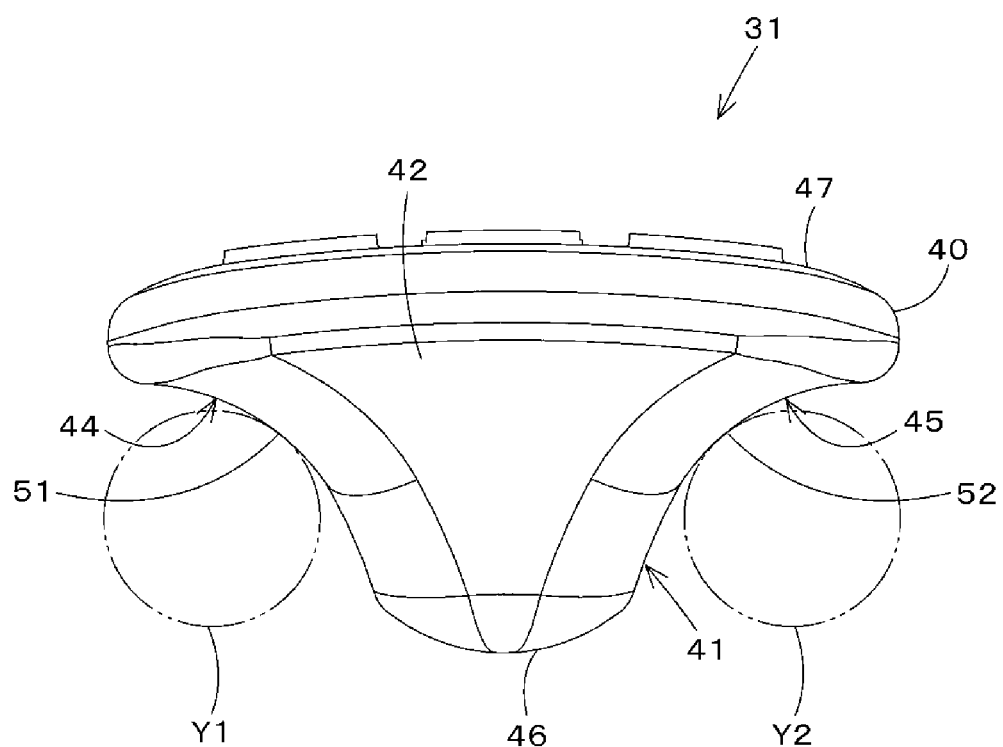
FIG. 17 is a diagram illustrating a state where a protruding portion of the grip is interposed by two fingers according to one or more embodiments.

In FIG. 17, outlines of cross sections of two fingers Y1 and Y2 interposing the protruding portion 41 are schematically represented by the virtual lines. As illustrated, one finger Y1 is disposed on a one-side-face 44 side of the protruding portion 41 and the other finger Y2 is disposed on an other-side-face 45 side of the protruding portion 41. The disposition of these two fingers Y1 and Y2 is performed by inserting the fingers from the distal side of the grip 31 toward the proximal side; by the one side face 44 and the other side face 45 being continuous with the distal face 42, there is no portion on the distal side of the grip 31 that blocks the fingers, enabling the fingers Y1 and Y2 to be easily inserted.

Here, as described above, in a situation of operating the forward-reverse switching lever 21 from the neutral position to the forward position or the reverse position, the forward-reverse switching lever 21 needs to be swung forward or rearward in a state where the lever main body 30 is pulled up at the neutral position. In light of this point, an action when operating the forward-reverse switching lever 21 of one or more embodiments from the neutral position to the forward position or the reverse position is described below.

Figure 18:
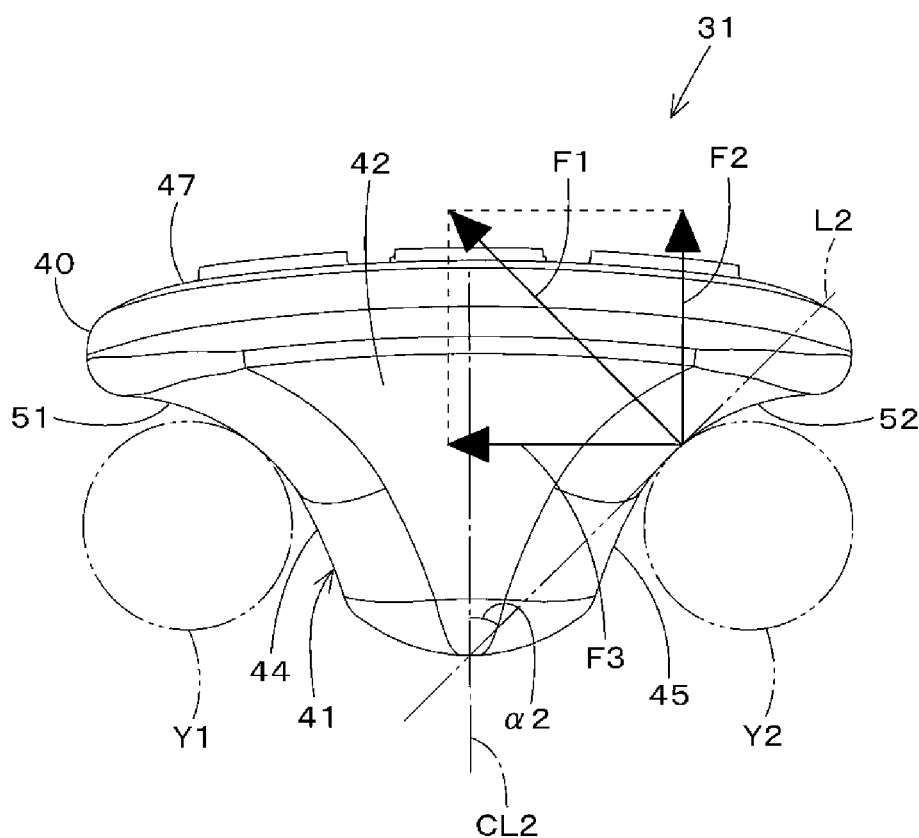
FIG. 18 is a diagram illustrating a direction of a force that acts on the grip when switching the forward-reverse lever to a forward position according to one or more embodiments.

First, a situation of operating the forward-reverse switching lever 21 from the neutral position to the forward position is described with reference to FIG. 18.

In the situation of operating the forward-reverse switching lever 21 from the neutral position to the forward position, upon interposing the protruding portion 41 of the grip 31 by two fingers (the one finger Y1 and the other finger Y2), a force F1 heading forward is applied to the other side face 45 of the protruding portion 41 by the other finger Y2. Here, because the one side face 44 and the other side face 45 are formed so as to gradually approach each other in heading downward and the other side face 45 is inclined so as to head forward in heading downward, the force F1 acts on the other side face 45 as a force heading diagonally forward and upward (forward and upward). By this, a first component force F2 heading upward and a second component force F3 heading forward act on the other side face 45 applied with the force F1. The first component force F2 acts as a force that pulls up on the lever main body 30. The second component force F3 acts as a force that swings the lever main body 30 forward. As such, by the actions of the first component force F2 and the second component force F3, the lever main body 30 is pulled up at the neutral position and swung forward. As a result, the forward-reverse switching lever 21 is switched from the neutral position to the forward position.

Next, a situation of operating the forward-reverse switching lever 21 from the neutral position to the forward position is described with reference to FIG. 19.

In the situation of operating the forward-reverse switching lever 21 from the neutral position to the reverse position, upon interposing the protruding portion 41 of the grip 31 by two fingers (the one finger Y1 and the other finger Y2), a force F4 heading rearward is applied to the one side face 44 of the protruding portion 41 by the one finger Y1. Here, because the one side face 44 and the other side face 45 are formed so as to gradually approach each other in heading downward and the one side face 44 is inclined so as to head rearward in heading downward, the force F4 acts on the one side face 44 as a force heading diagonally rearward and upward (rearward and upward). By this, a first component force F5 heading upward and a second component force F6 heading rearward act on the one side face 44 applied with the force F4. The first component force F5 acts as a force that pulls up on the lever main body 30. The second component force F6 acts as a force that swings the lever main body 30 rearward. As such, by the actions of the first component force F5 and the second component force F6, the lever main body 30 is pulled up at the neutral position and swung rearward. As a result, the forward-reverse switching lever 21 is switched from the neutral position to the reverse position.

As described above, according to the grip 31 of one or more embodiments, when the operator applies an operational force (pressing force) F1 to the other side face 45 of the protruding portion 41 by the finger Y2, the operational force F1 acts as the force heading diagonally upward and forward and the first component force F2 heading upward and the second component force F3 heading forward naturally arise. As such, the operator can swing the lever main body 30 forward while pulling up on the lever main body 30 to switch the forward-reverse switching lever 21 from the neutral position to the forward position without consciously performing the operation of pulling up on the lever main body 30. Moreover, when the operator applies an operational force (pressing force) F4 to the one side face 44 of the protruding portion 41 by the finger Y1, the operational force F4 acts as the force heading diagonally upward and rearward and the first component force F5 heading upward and the second component force F6 heading rearward naturally arise. As such, the operator can swing the lever main body 30 rearward while pulling up on the lever main body 30 to switch the forward-reverse switching lever 21 from the neutral position to the reverse position without consciously performing the operation of pulling up on the lever main body 30.

That is, according to the grip 31 of one or more embodiments, by one operation of pressing the one side face 44 or the other side face 45 of the protruding portion 41, the lever main body 30 can be swung forward or rearward while pulling up on the lever main body 30 to switch the forward-reverse switching lever 21 from the neutral position to the forward position or the reverse position. As such, a switching operation of the forward-reverse switching lever 21 can be easily performed and excellent operability is had. Moreover, finger strain is small even in a situation of repeating the switching operation of the forward-reverse switching lever 21.

Furthermore, because the forward-reverse switching lever 21 can be operated by interposing the protruding portion 41 of the grip 31 with two fingers, a force of holding the grip 31 can be sufficiently obtained compared to a grip that is operated by hooking one finger thereon, enabling the switching operation of the forward-reverse switching lever to be reliably performed.

Furthermore, as long as the operator does not apply the operational forces (pressing forces) F1, F4 by abutting the finger to the one side face 44 or the other side face 45 of the protruding portion 41, the component forces F2, F5 in a direction of pulling up on the lever main body 30 do not arise. As such, even in a situation where the hand hits the forward-reverse switching lever 21 against the operator's intention, the forward-reverse switching lever 21 does not switch from the neutral position, which is safe.

Furthermore, with the grip 31, because the protruding portion 41 is provided over the entire length in the depth direction A1, the operator can interpose the protruding portion 41 by deeply inserting the finger in the depth direction A1. This enables the switching operation of the forward-reverse switching lever 21 to be performed while reliably interposing and grasping the protruding portion 41 with two fingers.

Furthermore, with the grip 31, the one side face 44 has the first curved portion 51 that is recessed toward the other-side-face 45 side while moving downward and the other side face 45 has the second curved portion 52 that is recessed toward the one-side-face 44 side while moving downward. As such, a surface of the finger Y1 can be made to follow the first curved portion 51 and a surface of the finger Y2 can be made to follow the second curved portion 52. This facilitates force transmission to the one side face 44 and the other side face 45 and provides a favorable operational feel. Moreover, the first component forces F2, F5 in the direction of pulling up on the lever main body 30 can be made to reliably arise.

Figure 19:
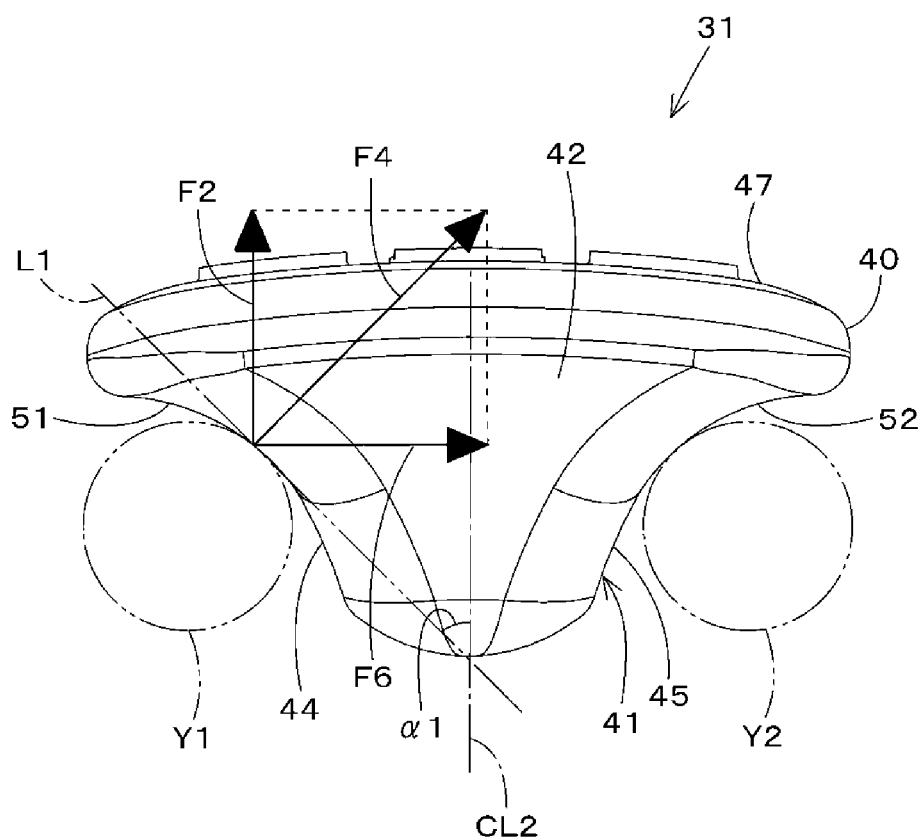
FIG. 19 is a diagram illustrating a direction of a force that acts on the grip when switching the forward-reverse lever to a reverse position according to one or more embodiments.

Here, one or more embodiments set an angle α1 illustrated in FIG. 19 between a tangent L1 at a vertex of a curve (most recessed portion) of the first curved portion 51 and a width-direction centerline CL2 to be about 45° (for example, 40° to 50°). Moreover, one or more embodiments set an angle α2 illustrated in FIG. 18 between a tangent L2 at a vertex of a curve (most recessed portion) of the second curved portion 52 and the width-direction centerline CL2 to be about 45° (for example, 40° to 50°). By setting to such angles, the first component forces F2, F5 in the direction of pulling up on the lever main body 30 and the second component forces F3, F6 in the direction of operating the forward-reverse switching lever 21 (forward or rearward) can be made to arise in a balanced manner. However, an angle between the tangent L1 and a normal L2 orthogonal to the tangent L1 is not limited to about 45° and can be changed as appropriate within a range where first component forces F2, F5 and second component forces F3, F6 suited to operating the forward-reverse switching lever 21 can be made to arise.

Furthermore, with the first curved portion 51, the curvature radius R1 at the intermediate portion between the one proximal portion 441 and the one distal portion 442 is smaller than the curvature radius R2 at the one distal portion 442 and with the second curved portion 52, the curvature radius R3 at the intermediate portion between the other proximal portion 451 and the other distal portion 452 is smaller than the curvature radius R4 at the other distal portion 452. In other words, the curvature radiuses of the first curved portion 51 and the second curved portion 52 increase in heading from the intermediate portion in the depth direction A1 to the distal side.

As such, when the operator operates the forward-reverse switching lever 21 by the other finger while rotating the steering wheel 19 around the vicinity of the base of the thumb by hooking the thumb on the steering wheel 19, the fingertip of the other finger moves in a circle around the vicinity of the base of the thumb, gradually increasing an amount of the grip 31 pressed by the other finger in conjunction therewith. That is, because the other finger moves while sliding on the one side face 44 and the other side face 45 toward the distal side that is the direction wherein the curvature radius increases, a reaction force received from the grip 31 gradually increases. At this time, when a force of moving the finger is constant, the finger is pushed back by the reaction force received from the grip 31, naturally increasing the force of the finger pressing the grip against the reaction force. This enables the operator to naturally apply force in the fingertip when operating the forward-reverse switching lever 21 and enables an appropriate operating force to be obtained. As such, there is no need to apply an unnecessarily excessive force when operating the forward-reverse switching lever 21 and the finger slipping off of the grip and finger pain due to repeated operations can be prevented.

Although there is a method of applying a roughening treatment such as texturing to a surface of the grip 31 as a countermeasure against slipping for the grip 31, this method may cause pain due to the finger rubbing the rough surface. Moreover, although there is also a method of applying an anti-slip coating of rubber or the like on the surface of the grip 31, with this method, sliding of the finger becomes unfavorable, worsening operability. In contrast, according to the grip 31 of one or more embodiments, as described above, an appropriate operating force can be obtained despite the surface of the grip 31 being smooth, which enables finger pain and reduced operability to be prevented.

Furthermore, the first side face 44 has the first constricted portion 44*a* that is recessed toward the other-side-face 45 side in the bottom view and the other side face 45 has the second constricted portion 45*a* that is recessed toward the one-side-face 44 side in the bottom view. This configuration also enables the operator to naturally apply force in the fingertip when operating the forward-reverse switching lever 21 and enables an appropriate operating force to be obtained. As such, there is no need to apply an unnecessarily excessive force when operating the forward-reverse switching lever 21 and the finger slipping off of the grip and finger pain due to repeated operations can be prevented.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

1 Traveling vehicle
2 Body
19 Steering wheel
21 Forward-reverse switching lever
30 Lever main body
31 Grip
31*a* Engaging portion
40 Base portion
41 Protruding portion
42 Distal face
43 Proximal face
44 One side face
44*a* First constricted portion
442 One distal portion
45 Other side face
45*a* Second constricted portion
452 Other distal portion
47 Upper face
51 First curved portion
52 Second curved portion

The invention claimed is:

1. A traveling vehicle comprising:
a body;
a steering wheel that is attached to the body and rotates around a rotating shaft; and
a forward-reverse switching lever that switches between a forward position, a neutral position, and a reverse position; wherein
the forward-reverse switching lever comprises:
a lever main body that is pulled up at the neutral position and swings forward or rearward in a pulled-up state; and
a grip mounted to an upper portion of the lever main body,
the grip comprises:
a base portion comprising an upper face; and
a protruding portion protruding downward from the base portion,
the protruding portion comprises:
a distal face that is opposite a rotating-shaft side of the protruding portion;
a first side face that is on a first side in a swinging direction of the forward-reverse switching lever and continues to the distal face; and
a second side face that is on a second side in the swinging direction and continues to the distal face, the first side face and the second side face gradually approaching each other as the first side face and the second side face go to a lower side,
the first side face comprises a first curved portion that is recessed toward a second-side-face side as the first curved portion moves downward,
the second side face comprises a second curved portion that is recessed toward a first-side-face side as the second curved portion moves downward,
the first side face comprises a first proximal portion positioned on the rotating-shaft side and a first distal portion positioned on another side opposite the rotating shaft,
the second side face comprises a second proximal portion positioned on the rotating-shaft side and a second distal portion positioned on another side opposite the rotating shaft,
the first curved portion has a first curvature radius smaller than a second curvature radius, the first curvature radius is of an intermediate portion between the first proximal portion and the first distal portion, and the second curvature radius is of the first distal portion, and
the second curved portion has a third curvature radius smaller than a fourth curvature radius, the third curvature radius is of an intermediate portion between the second proximal portion and the second distal portion, and the fourth curvature radius is of the second distal portion.

2. The traveling vehicle of claim 1, wherein the protruding portion extends over an entire length in a depth direction of the grip, the depth direction being along a direction from one side of the protruding portion opposite the rotating-shaft side to the rotating-shaft side.

3. The traveling vehicle of claim 1, wherein
the first side face has a first constricted portion that is recessed toward a second-side-face side viewed from a bottom side, and
the second side face has a second constricted portion that is recessed toward a first-side-face side viewed from the bottom side.

4. The traveling vehicle of claim 1, wherein
the grip comprises an engaging portion between the first side face and the second side face, and
the engaging portion engages with the lever main body.

5. The traveling vehicle of claim 1, further comprising:
a guide plate that regulates an operation of the lever main body, wherein
the guide plate comprises a guide groove into which one end of the lever main body is inserted.

6. The traveling vehicle of claim 1, wherein
the first curved portion comprises a first recessed portion that is recessed from a base of the protruding portion in a diagonally upward manner and bores the base portion, and
the second curved portion comprises a second recessed portion that is recessed from a base of the protruding portion in a diagonally upward manner and bores the base portion.

7. The traveling vehicle of claim 1, wherein
the first side face comprises a plurality of first ribs arranged in a depth direction of the grip, and
the second side face comprises a plurality of second ribs arranged in the depth direction.

8. A traveling vehicle comprising:
a body;
a steering wheel that is attached to the body and rotates around a rotating shaft; and
a forward-reverse switching lever that switches between a forward position, a neutral position, and a reverse position; wherein
the forward-reverse switching lever comprises:
   a lever main body that is pulled up at the neutral position and swings forward or rearward in a pulled-up state; and
   a grip mounted to an upper portion of the lever main body,
the grip comprises:
   a base portion comprising an upper face; and
   a protruding portion protruding downward from the base portion,
the protruding portion comprises:
   a distal face that is opposite a rotating-shaft side of the protruding portion;
   a first side face that is on a first side in a swinging direction of the forward-reverse switching lever and continues to the distal face; and
   a second side face that is on a second side in the swinging direction and continues to the distal face, the first side face and the second side face gradually approaching each other as the first side face and the second side face go to a lower side,
the first side face comprises a first curved portion that is recessed toward a second-side-face side as the first curved portion moves downward,
the second side face comprises a second curved portion that is recessed toward a first-side-face side as the second curved portion moves downward,
the first curved portion comprises a first recessed portion that is recessed from a base of the protruding portion in a diagonally upward manner and bores the base portion, and
the second curved portion comprises a second recessed portion that is recessed from a base of the protruding portion in a diagonally upward manner and bores the base portion.

9. The traveling vehicle of claim 8, wherein the protruding portion extends over an entire length in a depth direction of the grip, the depth direction being along a direction from one side of the protruding portion opposite the rotating-shaft side to the rotating-shaft side.

10. The traveling vehicle of claim 8, wherein
the first side face has a first constricted portion that is recessed toward a second-side-face side viewed from a bottom side, and
the second side face has a second constricted portion that is recessed toward a first-side-face side viewed from the bottom side.

11. The traveling vehicle of claim 8, wherein
the grip comprises an engaging portion between the first side face and the second side face, and
the engaging portion engages with the lever main body.

12. The traveling vehicle of claim 8, further comprising:
a guide plate that regulates an operation of the lever main body, wherein
the guide plate comprises a guide groove into which one end of the lever main body is inserted.

13. The traveling vehicle of claim 8, wherein
the first side face comprises a plurality of first ribs arranged in a depth direction of the grip, and
the second side face comprises a plurality of second ribs arranged in the depth direction.

14. A traveling vehicle comprising:
a body;
a steering wheel that is attached to the body and rotates around a rotating shaft; and
a forward-reverse switching lever that switches between a forward position, a neutral position, and a reverse position; wherein
the forward-reverse switching lever comprises:
   a lever main body that is pulled up at the neutral position and swings forward or rearward in a pulled-up state; and
   a grip mounted to an upper portion of the lever main body,
the grip comprises:
   a base portion comprising an upper face; and
   a protruding portion protruding downward from the base portion,
the protruding portion comprises:
   a distal face that is opposite a rotating-shaft side of the protruding portion;
   a first side face that is on a first side in a swinging direction of the forward-reverse switching lever and continues to the distal face; and
   a second side face that is on a second side in the swinging direction and continues to the distal face, the first side face and the second side face gradually approaching each other as the first side face and the second side face go to a lower side, and
the protruding portion is constricted in the swinging direction at a center of the protruding portion in a direction from the distal face toward the rotating-shaft side.

* * * * *